US012554287B1

(12) United States Patent
Oh et al.

(10) Patent No.: US 12,554,287 B1
(45) Date of Patent: Feb. 17, 2026

(54) OPEN CLOSE DETECTION OF FOLDABLE DEVICES

(71) Applicant: STMicroelectronics International N.V., Geneva (CH)

(72) Inventors: Kyeong Min Oh, Siheung-si (KR); Sung Ryong Byun, Gwacheon-si (KR); Hyunji Lee, Gwacheon-si (KR)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 0 days.

(21) Appl. No.: 18/975,831

(22) Filed: Dec. 10, 2024

(51) Int. Cl.
*G06F 3/041* (2006.01)
*G06F 1/16* (2006.01)
*G06F 1/18* (2006.01)
*G06F 1/3296* (2019.01)

(52) U.S. Cl.
CPC ............ *G06F 1/1652* (2013.01); *G06F 1/189* (2013.01); *G06F 1/3296* (2013.01)

(58) Field of Classification Search
CPC .... G06F 1/1641; G06F 1/1652; G06F 1/1677; G06F 1/189; G06F 1/3296; G09F 9/301
See application file for complete search history.

(56) References Cited

U.S. PATENT DOCUMENTS

| | | |
|---|---|---|
| 8,928,619 B1 | 1/2015 | Cho |
| 9,569,018 B2 | 2/2017 | Kang et al. |
| 10,444,917 B2 | 10/2019 | Seo et al. |
| 10,528,088 B2 | 1/2020 | Whitman et al. |
| 10,558,277 B2 | 2/2020 | Henell |
| 10,691,243 B2 | 6/2020 | Hei et al. |
| 10,754,483 B2 | 8/2020 | Seo et al. |
| 10,901,465 B2 | 1/2021 | Wu et al. |
| 11,209,914 B1 | 12/2021 | Hu |
| 11,573,663 B1 | 2/2023 | Yun et al. |
| 12,072,741 B1* | 8/2024 | Vandermeijden ..... G06F 1/1677 |
| 12,141,000 B2* | 11/2024 | Shen ..................... G06F 1/1616 |
| 12,153,753 B1* | 11/2024 | Lin ........................ G06F 3/0412 |
| 2013/0100053 A1 | 4/2013 | Kang et al. |
| 2015/0338888 A1 | 11/2015 | Kim et al. |
| 2015/0346875 A1 | 12/2015 | Yeh |
| 2015/0378557 A1 | 12/2015 | Jeong et al. |
| 2016/0070305 A1 | 3/2016 | Kim et al. |
| 2017/0097660 A1 | 4/2017 | Alonso et al. |
| 2017/0285837 A1 | 10/2017 | Zeng et al. |

(Continued)

*Primary Examiner* — Joe H Cheng
(74) *Attorney, Agent, or Firm* — Slater Matsil, LLP

(57) ABSTRACT

A method of operating a foldable touchscreen device includes detecting self-capacitances sensed in a folding area of the touchscreen using a self-sensing scan by a touchscreen controller, determining a reference strength sensed by the touchscreen in the folding area based on the self-capacitances in the folding area when the device is in a partially folded position, determining temperature information of the touchscreen in the partially folded position, in response to determining that the temperature information of the touchscreen is outside a predetermined temperature window, determining a corrected reference strength from the reference strength based on the temperature information, determining an angle strength for the partially folded position based on the corrected reference strength, and determining whether the device is open or closed based on the angle strength.

21 Claims, 24 Drawing Sheets

(56) References Cited

U.S. PATENT DOCUMENTS

| | | |
|---|---|---|
| 2018/0039339 A1 | 2/2018 | Henell |
| 2018/0059822 A1 | 3/2018 | Seo et al. |
| 2018/0088633 A1 | 3/2018 | Whitman et al. |
| 2019/0042042 A1 | 2/2019 | Hei et al. |
| 2020/0012367 A1 | 1/2020 | Seo et al. |
| 2020/0073446 A1 | 3/2020 | Wu et al. |
| 2021/0149542 A1 | 5/2021 | Kim et al. |
| 2022/0283684 A1 | 9/2022 | Zhang |
| 2023/0239391 A1 | 7/2023 | Zhou et al. |
| 2024/0167803 A1 | 5/2024 | Vandermeijden et al. |

\* cited by examiner

| Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Pure STR | 235 | 240 | 247 | 254 | 265 | 278 | 290 | 303 | 192 | 197 | 201 | 204 | 207 | 211 | 219 | 227 |

Indices 0–7: New; Indices 8–15: Old

Pure STR Diff = ABS(Old − New)
=> ABS(1658 - 2112) = 454

Current Index (0 ~ 15 Loop) — at index 7

| Edge State | State Change Condition | Change State |
|---|---|---|
| Stable | Pure STR Diff > Detect Threshold | Detect |
| Detect | Pure STR Diff > Release Threshold | Release |
| Release | Pure STR Diff < Stable Threshold | Stable |

|  | Rx20 | Rx22 |
|---|---|---|
| Ref Raw | 379 | -150 |
| Raw | 400 | -168 |
| Ref Differential | -21 | 18 |
| Ref Strength | ABS(-21) + ABS(18) = 39 | |

FIG. 8A

|  | Rx20 | Rx22 |
|---|---|---|
| Ref Raw | 902 | -658 |
| Raw | 888 | -646 |
| Ref Differential | 14 | -12 |
| Ref Strength | ABS(14) + ABS(-12) = 26 | |

FIG. 8B

|  | Rx20 | Rx22 |
|---|---|---|
| Ref Raw | 1523 | -1251 |
| Raw | 1529 | -1262 |
| Ref Differential | -6 | 11 |
| Ref Strength | (ABS(-6) + ABS(11))*1.9 = 32 | |
| Angle Strength | 2854 + 32 = 2886 | |

| Strength Type | CH18 | CH19 | CH20 | CH21 | CH22 | CH23 | CH24 |
|---|---|---|---|---|---|---|---|
| Touch | 37 | -28 | -679 | -338 | 912 | 190 | -48 |
| Folded | 40 | 314 | 1368 | 174 | -348 | -1330 | -177 |

1104

OPEN CLOSE DETECTION OF FOLDABLE DEVICES

TECHNICAL FIELD

The present invention relates generally to electronic devices and, in particular embodiments, to open close detection of a foldable display.

BACKGROUND

Electronic devices that are designed for user interaction have historically utilized external input devices such as keyboards, key pads, and/or mice to capture user input. In recent years, there has been a push from the more traditional methods, as consumers prefer the convenience of portable devices that can support a more flexible lifestyle. To this end, there has been a rise in smaller, portable, hand-held electronic devices, such as mobile phones, tablets, gaming systems, etc. This has given rise to the popularity of touch screens and touch panel displays as systems for capturing user input. Not only do they provide the functionality of the traditional electronic devices, but touchscreens provide additional features. For example, given the appropriate software, users are able to utilize touchscreens for sketching, drawing, and various hand writing applications.

With the development of flexible displays that are capable of being folded, the size of a display may be increased without increasing the size of the device. However foldable displays come with their own set of advantages and disadvantages. Foldable displays require additional components such as hall sensors to detect the angle at which the flexible touchscreen is folded (i.e. to determine whether the touchscreen is open or closed) which increases the power consumption of the electronic device.

SUMMARY

Embodiments of the invention provide a method for open close detection of foldable devices to improve the user experience, power consumption, and manufacturing costs of foldable devices. As discussed below, embodiments relate to flexible touchscreens in combination with foldable devices.

One general aspect includes a method of operating an electronic device. The method comprises detecting, by a touchscreen controller, self-capacitances sensed in a folding area of a touchscreen using a self-sensing scan, where the folding area includes a first portion and a second portion on the touchscreen, and the first portion and the second portion are separated by a folding axis. The method also comprises determining, in a partially folded position, a reference strength sensed by the touchscreen in the folding area based on the self-capacitances in the folding area, determining that the device is outside a half-folded position based on the reference strength, in response to determining that the device is outside the half-folded position, determining temperature information of the touchscreen, in response to determining that the temperature information of the touchscreen is outside a predetermined temperature window, determining a corrected reference strength from the reference strength based on the temperature information, determining an angle strength for the partially folded position based on the corrected reference strength, and determining whether the device is open or closed based on the angle strength.

Another general aspect includes a method of operating an electronic device. The method comprises detecting, by a touchscreen controller, self-capacitances sensed in a folding area of a touchscreen using a self-sensing scan, where the folding area includes a first portion and a second portion on the touchscreen, and the first portion and the second portion are separated by a folding axis, in a partially folded position, determining a reference strength sensed by the touchscreen in the folding area based on the self-capacitances in the folding area, determining that the device is outside a half-folded position based on the reference strength, determining a first corrected reference strength from the reference strength based on the temperature information in response to determining that temperature information of the touchscreen is outside a predetermined temperature window or determining a second corrected reference strength from the reference strength to account for a lower operating voltage of the low power operating mode in response to determining that the touchscreen is in a low power operating mode, and determining an angle strength for the partially folded position based on the first or second corrected reference strength.

Another general aspect includes a device having a touchscreen that includes a first portion and a second portion, the first portion configured to be rotated with respect to the second portion around a folding axis positioned within a folding area, a touchscreen controller, and a memory for storing a program to be executed in the touchscreen controller. The program includes instructions to detect self-capacitances sensed in the folding area of the touchscreen using a self-sensing scan, determine, in a partially folded position, a reference strength sensed by the touchscreen in the folding area based on the self-capacitances in the folding area, determine that the touchscreen is outside a half-folded position based on the reference strength, determine a first corrected reference strength from the reference strength based on the temperature information in response to temperature information of the touchscreen being outside a predetermined temperature window, determine a second corrected reference strength from the reference strength to account for a lower operating voltage of the low power mode in response to the touchscreen operating in low power mode, or determining a third corrected reference strength to amplify the reference strength based on the folding angle of the device and the folded threshold in response to a folding angle of the touchscreen being more than a folded threshold, and determine an angle strength for the folded position based on the first, second, or third corrected reference strength.

Other embodiments and variations are described herein.

BRIEF DESCRIPTION OF THE DRAWINGS

For a more complete understanding of the present invention, and the advantages thereof, reference is now made to the following descriptions taken in conjunction with the accompanying drawings, in which:

FIGS. 1A-1F illustrate an electronic device having a flexible touchscreen in accordance with an embodiment of the present application, wherein FIG. 1A illustrates a schematic view of the electronic device in a fully open position, FIG. 1B illustrates a schematic view of the electronic device in a partially open position, FIG. 1C illustrates a schematic view of the electronic device in a fully closed position, FIG. 1D illustrates a component schematic of the electronic device, FIG. 1E illustrates a component schematic of the flexible touch screen and FIG. 1F illustrates a component schematic of a touch sensing layer of the flexible touchscreen;

FIGS. 2A-2B illustrates exemplary capacitive strength electronic readout detected by an electronic device in accordance with an embodiment of the present application, wherein FIG. 2A illustrates an exemplary electronic readout of capacitive strengths detected by the electronic device, and FIG. 2B illustrates a graphical representation of the self-capacitive strengths sensed by the sense lines and drive lines of the flexible touchscreen in a folding area;

FIGS. 8A-8C illustrate exemplary implementation of calculating reference strengths and angle strengths in a foldable device according to an embodiment of the present application.

DETAILED DESCRIPTION OF ILLUSTRATIVE EMBODIMENTS

While foldable displays have led to great advances in the evolution of portable electronic devices, due to their delicate nature there are still limitations that exist. Namely, foldable displays capable of being enlarged by unfolding and reduced by folding require additional electrical components, such as Hall sensors, to detect the folding angle which can lead to an increase in power consumption, and an increase in manufacturing costs.

Embodiments of the present application relate to determining the folding angle of a flexible touchscreen without the use of such additional electronic components such as Hall sensors. Particularly, embodiments of the present application relate to determining a folding angle of a flexible touchscreen based on self-capacitances sensed by the flexible touchscreen as a first portion of the flexible touchscreen is rotated (e.g., folded) towards a second portion of the flexible touchscreen.

Embodiments of the present application eliminate the need for additional hardware components potentially reducing device cost and complexity. Embodiments of the present application can adjust for temperature variations that may affect folding detection reliability. Furthermore, embodiments of the present application can reduce power consumption based on the folding state. The embodiments demonstrate the capability to distinguish between capacitance changes caused by folding versus those resulting from touch input, enhancing its accuracy and user experience in folding detection.

Figure 1A:
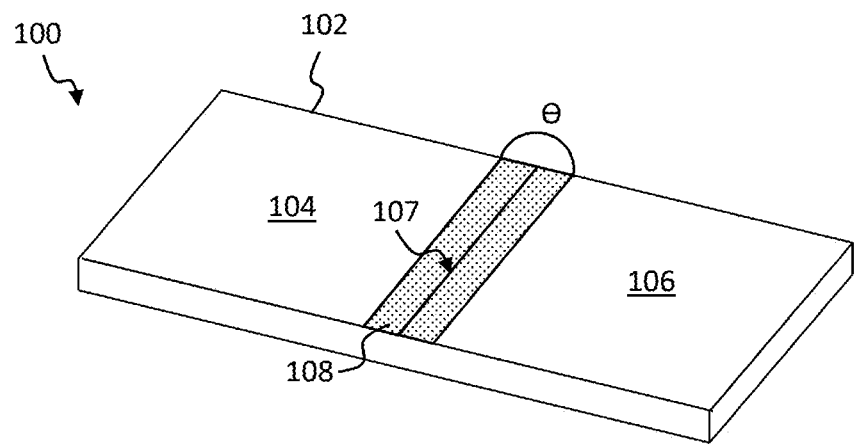
Figure 1B:
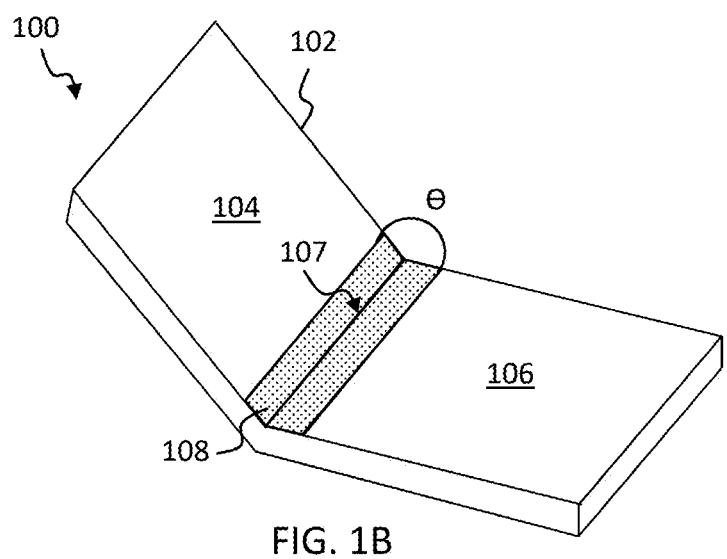
Figure 1C:
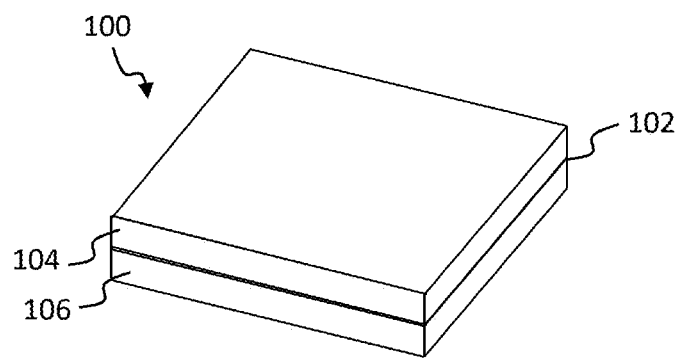
Figure 1D:
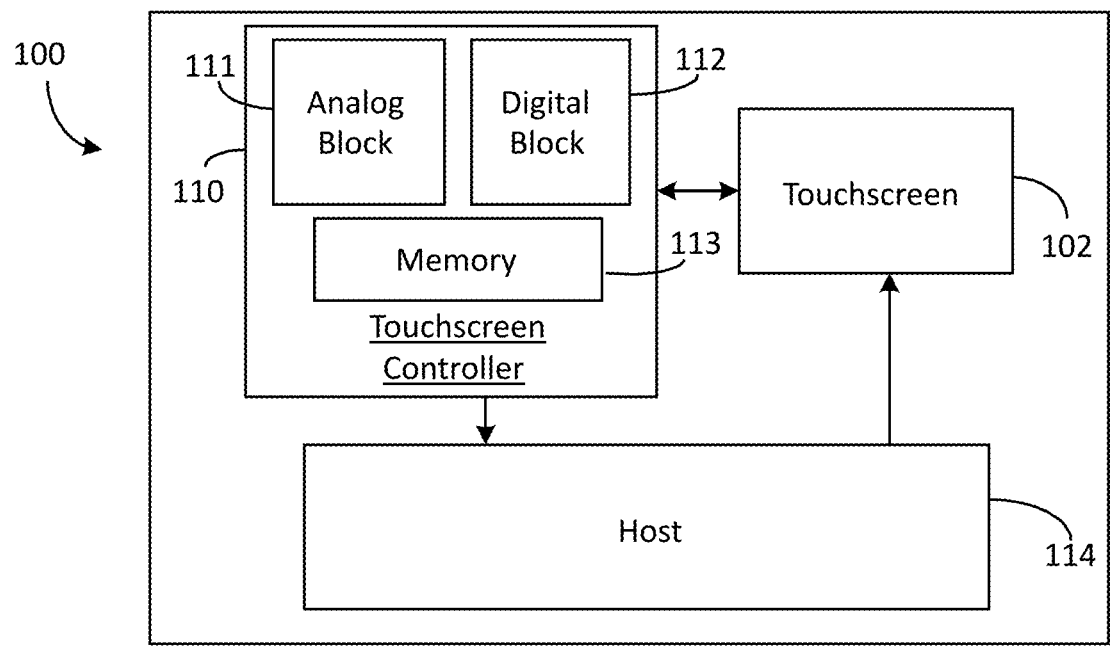
Figure 1E:
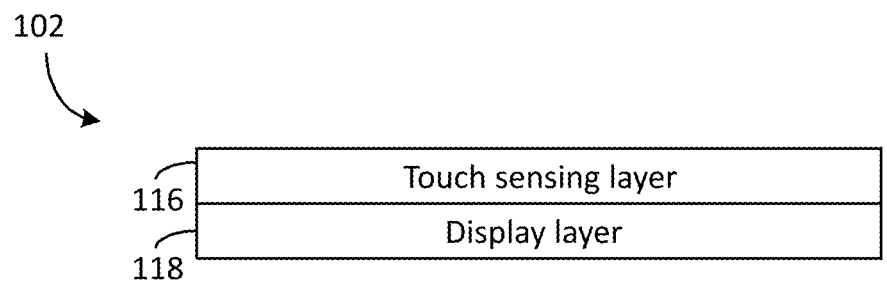
Figure 1F:
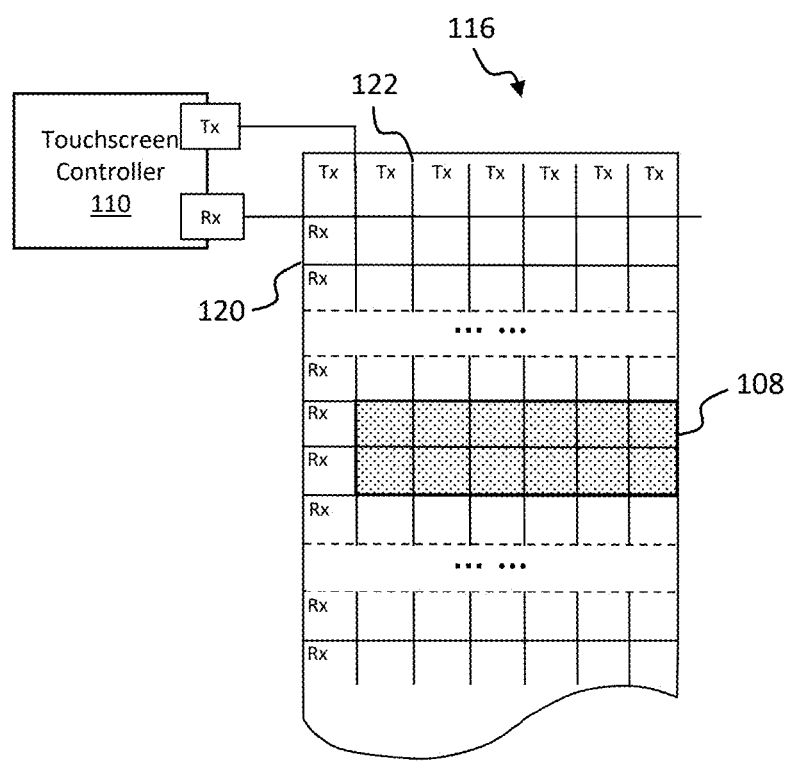

FIGS. 1A-1F illustrate an electronic device having a flexible touchscreen in accordance with an embodiment of the present application, wherein FIG. 1A illustrates a schematic view of the electronic device in a fully open position, FIG. 1B illustrates a schematic view of the electronic device in a partially open position, FIG. 1C illustrates a schematic view of the electronic device in a fully closed position, FIG. 1D illustrates a component schematic of the electronic device, FIG. 1E illustrates a component schematic of the flexible touchscreen, and FIG. 1F illustrates a component schematic of a touch sensing layer of the flexible touchscreen.

FIG. 1A illustrates a schematic detailing an embodiment of an electronic device 100 configured with a flexible touchscreen or foldable touchscreen 102. The electronic device may be a mobile phone, tablet, gaming system, or the like.

In various embodiments, the flexible touchscreen 102 may comprise a first portion 104, a second portion 106, and a folding area 108. The flexible touchscreen 102 may comprise a light emitting diode (LED) flexible display, organic LED flexible display, or any other type of flexible touchscreen 102. The flexible touchscreen 102 may be configured to be folded or unfolded by rotating the first portion towards or away from the second portion 106 along a folding axis 107 within the folding area 108. One side of the folding area 108 may be on the first portion 104 while the other side of the folding area 108 may be on the second portion 106. The sides of the folding area 108 may be separated by the folding axis 107. The folding axis 107 may include a foldable element such as a hinge element. In other words, the folding axis 107 may include any element that allows the first portion 104 to be rotated with respect to the second portion 106 (and vice versa). For example, the first portion 104 and the second portion 106 may be separate elements coupled by the folding area 108 or may be formed as a single body.

The flexible touchscreen 102 may be configured to be rotated to a folding angle θ. The folding angle θ may be defined as the angle between the first portion 104 and the second portion 106 around the folding axis 107. In other words, the folding axis 107 may allow various degrees of rotation between the first portion 104 and the second portion 106. In various embodiments, the flexible touchscreen 102 may be configured to be rotated between any angle between a completely unfolded position shown in FIG. 1A to a completely folded position shown in FIG. 1C. In other words, the folding angle θ may range from 180 degrees (e.g. the open position) to 0 degrees (e.g. the closed position). Alternatively, the folding angle θ may range from 0 degrees to 360 degrees.

FIG. 1B illustrates the flexible touchscreen 102 in in a partially folded position where the first portion 104 is partially rotated towards the second portion 106 around the folding area 108.

FIG. 1C illustrates the flexible touchscreen in a fully folded position in which the first portion 104 is rotated and contacting the second portion 106.

In the illustrations shown in FIGS. 1A-1C, the electronic device 100 is oriented so that the flexible touchscreen 102 is configured to be rotated across its width. In other words, the folding area 108 is across the width of the flexible touchscreen 102. This is known as flip mode. In other embodiments of the electronic device 100, the electronic device 100 may be oriented so that the flexible touchscreen 102 is configured to be rotated across its length. This is known as fold mode.

To monitor and determine the folding angle θ of the flexible touchscreen 102, embodiments as next described analyze touch sensing data sensed by the flexible touchscreen 102 in the folding area 108. In various embodiments, the electronic device may determine a linear relationship between known folding angles θ and the corresponding touch sensing data sensed in the folding area 108. Then using that relationship, the electronic device 100 may determine the folding angle θ. Advantageously, the electronic device 100 may determine the folding angle θ without adding any additional electronic components. In other words, the touch sensing data sensed by the flexible touchscreen 102 during a self-sensing scan in the folding area 108 may be analyzed by converting it to the strength domain. Then, the folding angle θ may be determined using the converted touch sensing data and the slope between at least two previously known folding angles θ.

FIG. 1D illustrates a component schematic of the electronic device.

Referring to FIG. 1D, the electronic device 100 may include a touchscreen controller 110, the flexible touchscreen 102, and a host 114 that may be coupled to each other through a bus. The electronic device 100 may be a smart phone, a GPS device, a tablet computer, a mobile media player, a laptop, a gaming system, a personal computer, or any other electronic device that may utilize a flexible touchscreen 102.

In various embodiments, host 114, may also be known as a system on chip and may comprise a processor, interface, circuitry, and/or the like configured to direct the flow of input and output data to the flexible touchscreen 102 and the associated touchscreen controller 110. A memory may be integrated onto the host 114. The memory may be programmed for short term and/or long term memory storage. The memory may comprise various programs to be executed in the host 114. The memory may include both volatile and non-volatile memories.

The touchscreen controller 110 may perform various methods with respect to the flexible touchscreen 102. In various embodiments, the touchscreen controller 110 may analyze information and carry out a series of firmware (FW) algorithms based on user input. In various embodiments, the touchscreen controller 110 may include, an analog block 111, a digital block 112 and a memory 113 operable by a processor. The analog block in may include a plurality of analog circuits configured to measure capacitances across the flexible touchscreen 102 and convert them into digital values. The digital block 112 may comprise a variety of digital logic circuits such as DACs or digital control systems configured to obtain digital touch data from the analog block 111, process the digital touch data and store them into memory 113.

In various embodiments, the memory 113 may be programmed for short term and/or long term memory storage. The memory 113 may be configured to store data generated by the touchscreen controller 110 and may comprise various programs to be executed in the touchscreen controller 110. The memory 113 may include both volatile and non-volatile memories.

In one or more embodiments, the processor may comprise an application-specific integrated circuit (ASIC) device, a central processing unit (CPU), or an Advanced RISC Machine (ARM) core, or any other processing unit known in the art. In various embodiments, the touchscreen controller 110 may comprise a number of separate computing units such as cores integrated within one processor, or distinct separate processing chips.

The flexible touchscreen 102 is designed to register user input via touches made to its surface. The electronic device 100 may also be configured to detect input from the flexible touchscreen 102 that may also come from input given from a stylus (active or passive) device. In various embodiments, the flexible touchscreen 102 may include sensors such as gyroscopes or accelerometers. One or more of these sensors may be integrated together.

The host 114 may be configured to transmit image data to the flexible touchscreen 102 to be displayed on the flexible touchscreen 102 based on the folding angle θ. The folding angle θ may be transmitted by the touchscreen controller 110 to the host 114. In various embodiments, the touchscreen controller 110 may be configured to perform mutual and self-sensing scans to detect the amount of change in strength of mutual and self-capacitances and based thereon calculate and report the folding angle θ to the host 114.

FIG. 1E illustrates a schematic of the flexible touchscreen 102. In various embodiments the flexible touchscreen 102 may include a touch sensing layer 116 and a display layer 118. The touch sensing layer 116 and the display layer 118 may be situated on the front facing side of the electronic device 100. The display layer 118 may comprise a light emitting diode (LED) display, organic LED display, LCD, AMOLED, or any other type of display.

FIG. 1F illustrates a schematic of the touch sensing layer 116. In various embodiments, the touch sensing layer 116 may comprise drive lines 122 and sense lines 120 that span the entirety of the flexible touchscreen 102 in a grid-like fashion that are operable by the touchscreen controller 110. In various embodiments, the drive lines 122 may be formed in columns across the flexible touchscreen 102 and the sense lines 120 may be formed in rows across the flexible touchscreen 102 (or vice versa). The number of drive and sense lines used are not limited by this application.

The drive lines 122 and the sense lines 120 may overlap in certain embodiments. While FIG. 1F depicts the drive lines 122 and the sense lines 120 overlapping in an orthogonal manner, they may overlap other than orthogonally such as being interleaved or at various angles.

The drive lines 122 and the sense lines 120 may have a measurable mutual capacitance at their intersections as to form a matrix of Tx electrodes and Rx electrodes across the flexible touchscreen 102. The Tx electrodes are arranged in columns along the drive lines 122, and the Rx electrodes are arranged in rows along the sense lines 120. At each intersection point of a Tx and Rx electrode, a touch node is formed. The touch nodes (or sensing nodes) can detect changes in capacitance caused by a user's touch or proximity to the screen. The folding area 108 spans the region around the hinge mechanism or folding axis 107, as shown in FIGS. 1A-1B, and includes multiple touch nodes. The touch nodes within the folding area 108 may be utilized to detect the folding state of the device 100.

When the device is folded or unfolded, a physical deformation of the touchscreen in the folding area 108 causes changes in the capacitance values measured at these touch nodes. These changes occur due to variations in the distance and alignment between the Tx and Rx electrodes as the screen bends. The capacitance changes in the folding area 108 can determine the folding state of the device 100. By continuously monitoring the capacitance values of the touch nodes in the folding area 108, the device can detect patterns that indicate opening, closing, or intermediate folding states.

The specific number and arrangement of touch nodes in the folding area 108 may vary depending on the device's size and design. However, the principle of using these nodes for fold detection remains consistent across various implementations.

As appreciated by those with ordinary skill in the art, each of the drive lines 122 and the sense lines 120 may also have a self-capacitance 124 that is measurable. In other words, the drive lines 122 and the sense lines 120 are operable in mutual sensing mode and a self-sensing mode. More information regarding the using the facets of mutual sensing scans, and self-sensing scans to determine the folding angle θ of the flexible touchscreen 102 will be described further below.

Figure 2A:
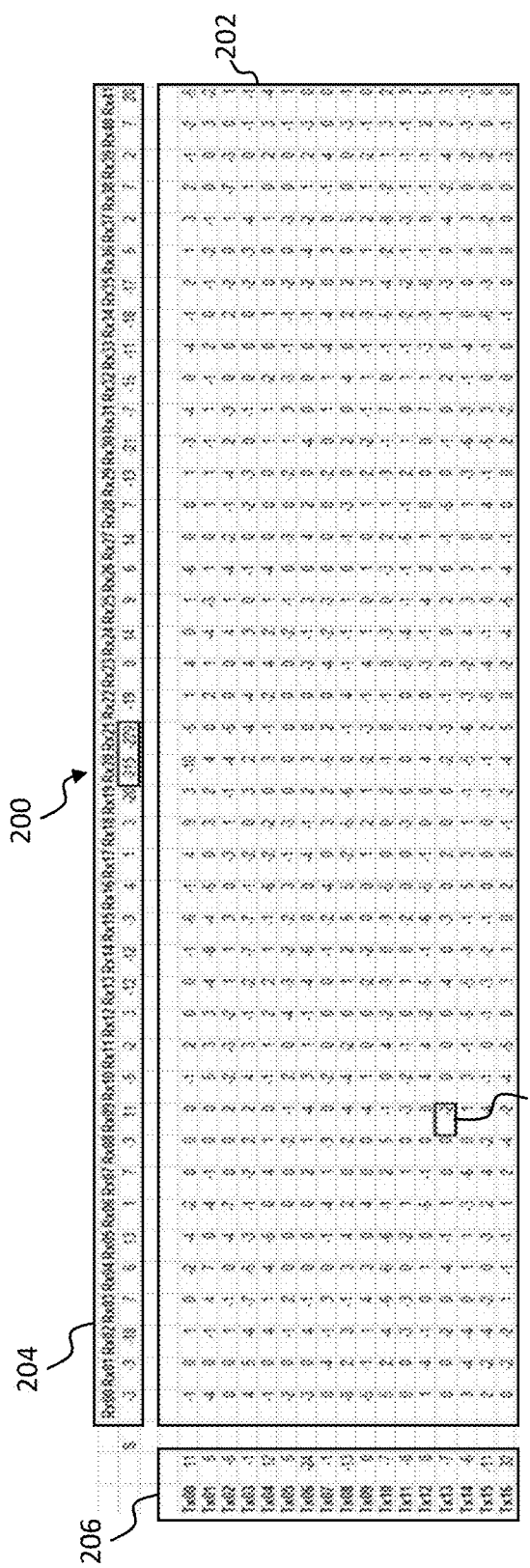
Figure 2B:
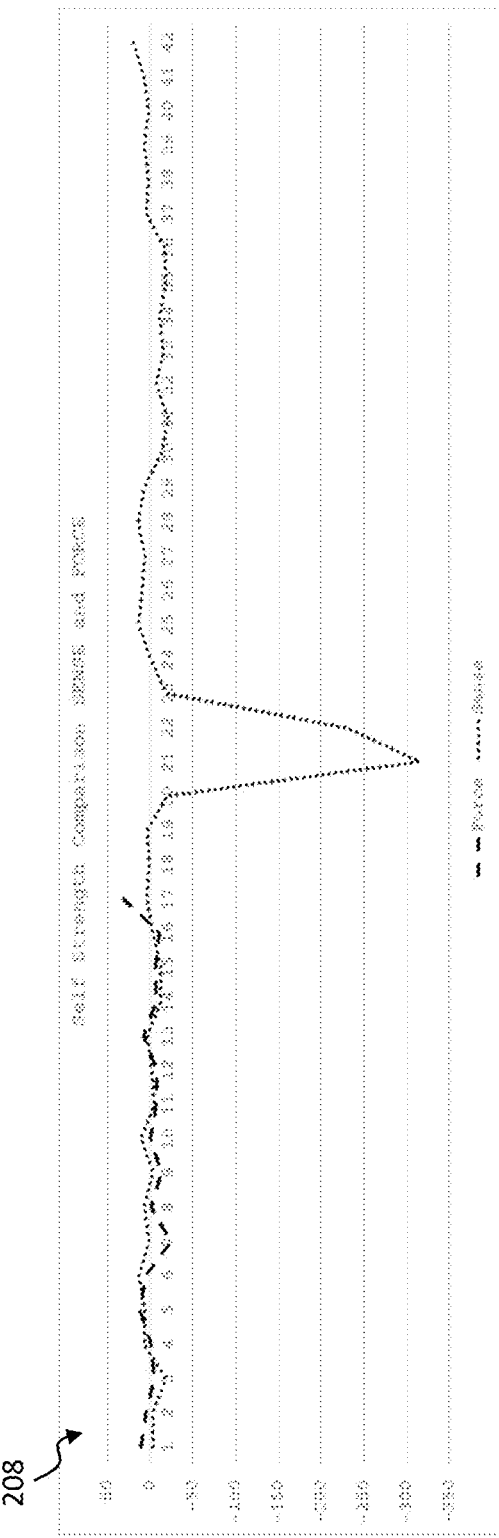

FIGS. 2A-2B illustrates exemplary capacitive strength electronic readout detected by an electronic device in accordance with an embodiment of the present application, wherein FIG. 2A illustrates an exemplary electronic readout of capacitive strengths detected by the electronic device, and FIG. 2B illustrates a graphical representation of the self-capacitive strengths sensed by the sense lines and drive lines of the flexible touchscreen in a folding area.

FIG. 2A illustrates an exemplary electronic readout 200 of capacitive strengths detected by the electronic device 100 that includes strengths detected from a mutual sensing scan and a self-sensing scan.

According to an embodiment of the invention, the strength values 203 pertain to capacitive-based information generated from the sense lines 120 and the drive lines 122.

The electronic readout 200 comprises strength values 203 arranged as mutual strengths 202, self-sense strengths 204, and self-force strengths 206.

The mutual strengths 202 are arranged in a matrix like fashion. In one or more embodiments, the mutual sensing process includes the touchscreen controller 110 selecting and driving a particular row of the drive lines 122 with a voltage and scanning every column of the sense lines 120. In this manner, the change in the mutual capacitance 123 at each intersection between a respective driven drive line 122 and sense line 120 is measured, resulting in mutual sensing raw data. This process is repeated sequentially for each drive line 122 to determine the rest of the mutual sensing raw data. Then, after determining each value of the mutual sensing raw data, each value of the mutual sensing raw data may be subtracted from a corresponding baseline strength, resulting in mutual strengths 202.

In other words, during the mutual sensing scan when a row of the drive lines 122 are driven, electric fields form between adjacent electrodes of the driven drives line and the respective intersecting columns of the sense lines 120. When capacitive objects such as human fingers or a stylus, touch the flexible touchscreen 102, the electric field lines going through the air between adjacent lines is replaced to pass through the capacitive objects. These interruptions in the electric fields cause a detectable change in the mutual capacitance that can be quantified as mutual sensing raw data and may be converted into mutual strengths 202 by subtracting them from a corresponding baseline strength.

Additionally, the self-sensing capacitive strengths may be arranged in rows of self-sense strengths 204 and/or columns of self-force strengths 206. The self-sensing scan may include the touchscreen controller 110 driving (with a voltage) and scanning each of the sense lines 120 and drive lines 122. In other embodiments, the self-sensing process may include driving and scanning either each of the sense lines 120 or each of the drive lines 122. During the self-sensing process, the self-capacitance 124 of each of sense lines 120 and drive lines 122 are measured to obtain self-sensing raw data. The self-sensing raw data sensed by the sense lines 120 may be defined as the self-sense raw data. The self-sensing raw data sensed by the drive lines 122 may be defined as self-force raw data.

When a capacitive object is brought proximate to a driven sense line 120 or drive line 122, it adds an additional capacitance that can be measured. This additional capacitance results in a charge transfer and therefore a flow of current that may be measured. The additional current sensed by the sense lines 120 may be quantified as self-sense raw data corresponding to each sense line 120. In the same manner described above, the self-sense raw data may be converted to self-sense strengths 204 by subtracting the self-sense raw data from a corresponding baseline strength.

Similarly, the additional current sensed by each drive line 122 may be quantified as self-force raw data and may be converted to self-force strengths 206 in the same manner discussed above. As understood by those with ordinary skill in the art, the self-sense strengths 204 may be arranged in a single row representing each sense line 120, and the self-force strengths 206 may be arranged in a single column representing each drive line 122.

The self-capacitances 124 sensed in the folding area 108 changes based on the folding angle θ. As the first portion 104 is rotated, the sense lines 120 or the drive lines 122 (depending on the orientation of the rotation) in the folding area 108 experience a noticeable change in their self-capacitances 124. In other words, the sense lines 120 or drive lines 122 within the folding area 108 may sense the first portion 104 being rotated towards the second portion 106.

For example as illustrated in graph 208 FIG. 2B, when the electronic device 100 is in flip mode and the flexible touchscreen 102 is rotated in the direction of the sense lines 120, there is only a noticeable change in the self-sense strength values in the folding area 108, while there is little variation in the self-force strength values in the folding area 108 (e.g. the values in the center of the self-sense strengths 204).

Therefore, in various embodiments, the folding angle θ may be determined based on the self-sense strengths 204 or the self-force strengths 206 across the folding area 108 depending on the orientation of the rotation. This will be discussed in more detail below.

Although the embodiments described below will be discussed in reference to an electronic device 100 configured for flip mode, this is for example purposes only. In other words, although the process steps will be described with respect to the self-sense strengths, the same process steps may be performed using the self-force strengths if the electronic device 100 is in fold mode.

Figure 3:
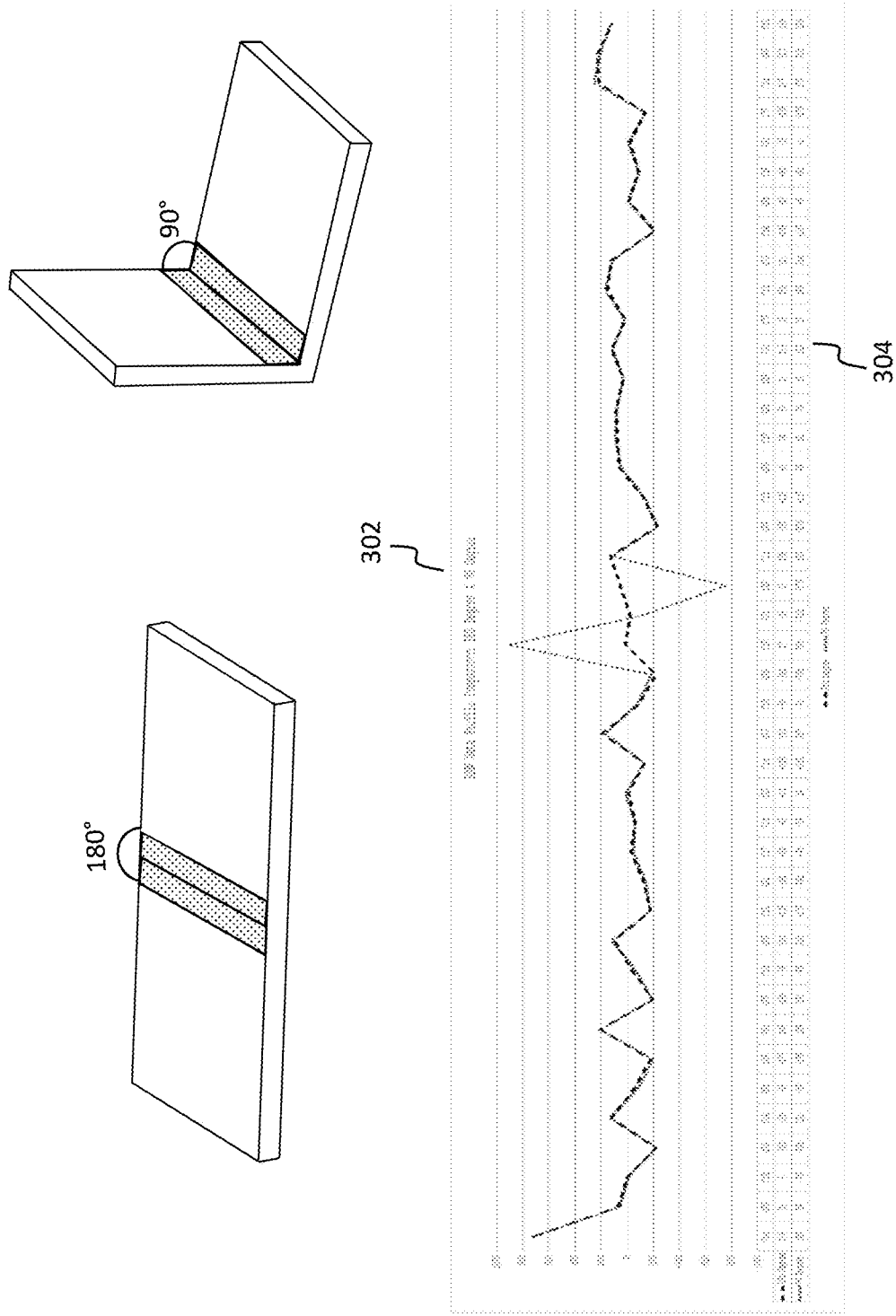
FIG. 3 illustrates a graphical representation of the self-sense raw data detected by the flexible touchscreen in the folding area for two different folding angles in according to an embodiment of the present application.

FIG. 3 illustrates a graphical representation of the self-sense raw data detected by the flexible touchscreen in the folding area for two different folding angles in according to an embodiment of the present application.

FIG. 3 illustrates the differences in the self-sense raw touch data sensed by the sense-lines during a self-sensing scan in flip mode when the folding angle θ of the flexible touchscreen 102 is fully open and equal to 180 degrees and when the flexible touchscreen 102 is rotated to 90 degrees. As illustrated by both the graph 302 and the table 304 when the first portion 104 is rotated from 180 to 90 degrees, there is only a noticeable change in the self-capacitances 124 sensed by the sense lines 120 in the folding area 108 (e.g. columns 21-23). In other words, the more the first portion 104 is rotated towards the second portion 106, the more the folding area 108 senses the first portion 104 (and vice versa). The self-capacitances 124 sensed in the folding area 108 may be correlated to and used to determine the folding angle θ.

Figure 4:
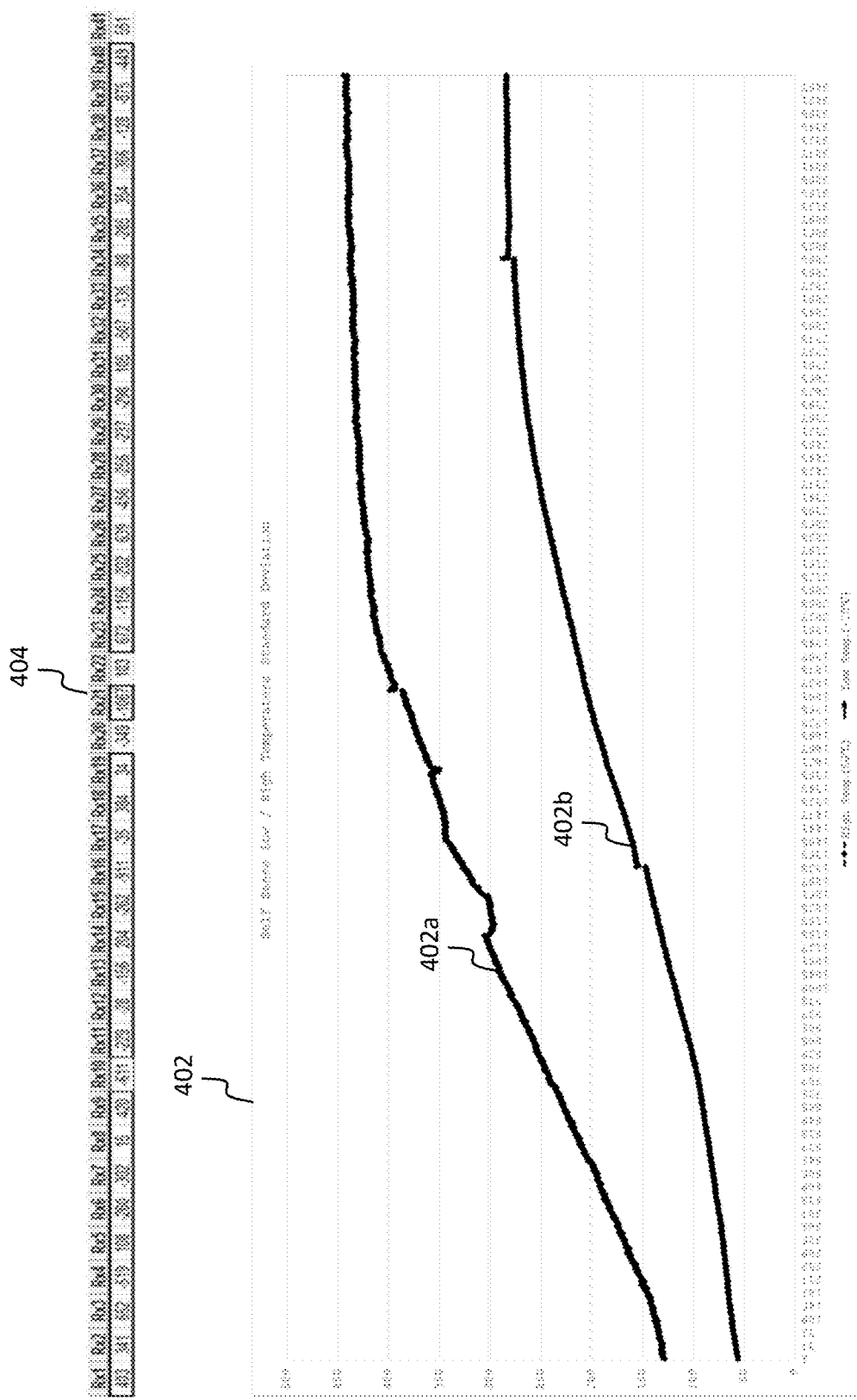
FIG. 4 illustrates a graphical representation of the self-sense standard deviation detected by the flexible touchscreen in areas outside of the folding area for a low temperature and a high temperature according to an embodiment of the present application.

FIG. 4 illustrates a graphical representation of the self-sense standard deviation detected by the flexible touchscreen in areas outside of the folding area for a low temperature and a high temperature according to an embodiment of the present application.

FIG. 4 illustrates a graph 402 that includes a low temperature standard deviation 402a and a high temperature standard deviation 402b determined by the self-sense raw data sensed by the sense lines 120 during a self-sensing scan. In low or high temperatures, the self-sense standard deviation gradually increases as shown in the graph 402. The self-sense standard deviation is calculated from the sense lines 120 in between the edge areas of the flexible touchscreen and portions of the folding area. The self-sense standard deviation calculation excludes the edge areas (e.g., Rx1 and Rx 41) of the flexible touchscreen, a first and second portion (e.g., Rx20 and Rx22) of the folding area 108, and sense lines receiving touch inputs. For example, referring to the table 404, the self-sense standard deviation calculation includes Rx2 through Rx19, Rx21, and Rx23 through Rx40. The low temperature may be set, for example, at 20° C. and the high temperature may be set, for example, at 6° C.

Figure 5A:
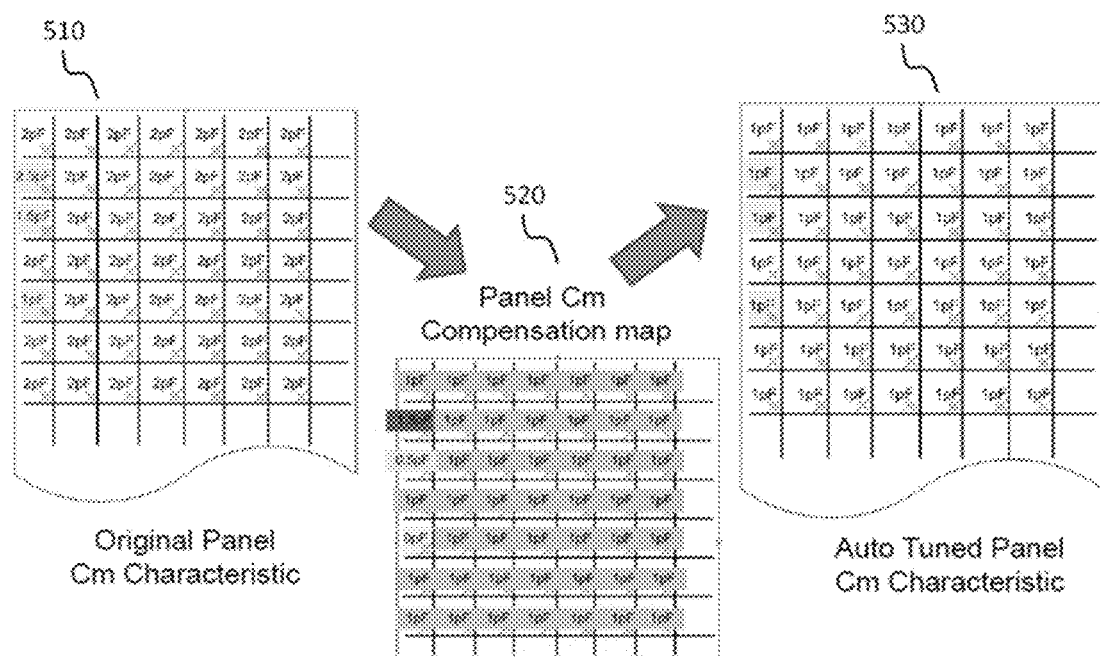
FIGS. 5A-5C illustrate schematic views of the process steps for determining the capacitive strengths sensed by the flexible touchscreen based on baseline strengths of the flexible touchscreen based on pure raw data in accordance with an embodiment of the present application.
Figure 5B:
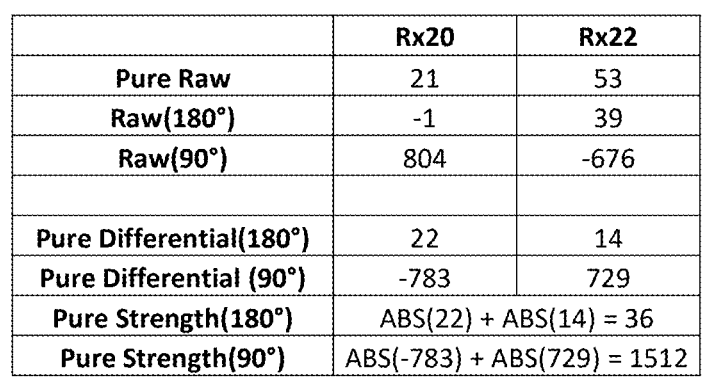
Figure 5C:
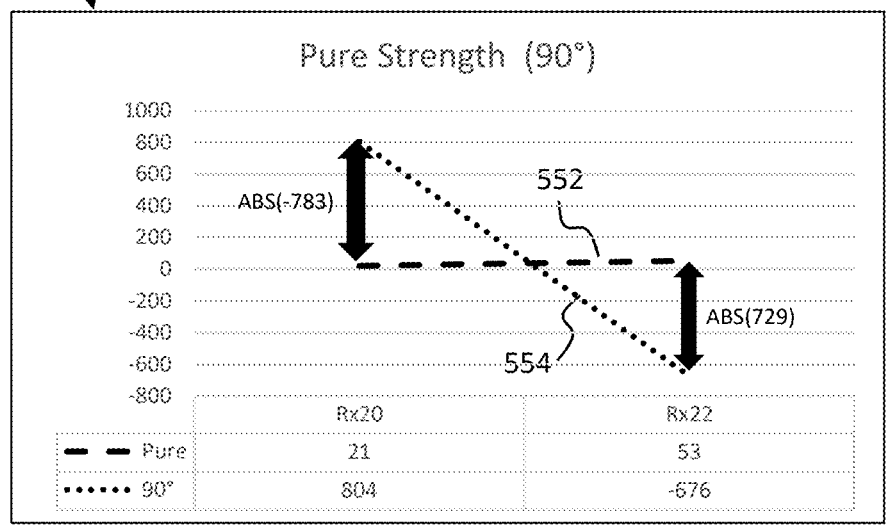

FIGS. 5A-5C illustrate schematic views of the process steps for determining the capacitive strengths sensed by the flexible touchscreen based on baseline strengths of the flexible touchscreen based on pure raw data in accordance with an embodiment of the present application, wherein FIG. 5A illustrates schematic views of the process steps for autotuning the flexible touchscreen to determine pure raw data, FIG. 5B illustrates a table of how pure raw data can be used to detect the folding state, and FIG. 5C illustrates a graphical representation of capacitive strengths sensed in the folding area based on the pure raw data.

Referring to FIG. 5A, prior to scanning the flexible touchscreen 102 using the mutual and self-sensing scans, pure raw self-sensing data, and pure raw mutual sensing data may be determined for each of the self and mutual capacitances.

Upon receiving the request from the host 114 to set a baseline strength, the touchscreen controller 110 may scan the flexible touchscreen 102 in a fully open state (e.g., θ=180°) and determine each of the mutual capacitances to create strength to edge detection in the self-sense raw data. For example, in the original touchscreen panel 510, each of the mutual capacitances may equal 2 pF except for a first mutual capacitance which is equal to 2.5 pF and a second mutual capacitance equal to 1.5 pF and a third mutual capacitance equal to 1 pF.

Based on the mutual capacitances of the original touchscreen panel 510, the touchscreen controller 110 may generate a compensation map 520 to change the capacitances to equalize each of the mutual capacitances. For example, the compensation map 520 changes the mutual capacitances required for all the mutual capacitances to be equal to 1 pF.

Then based on the compensation map 520, the touchscreen controller 110 may then transmit the required compensation signals, defined as an autotune signal, to the flexible touchscreen 102 in order to equalize the mutual capacitances. In other words, the touchscreen controller 110 may determine a compensation map and transmit an autotune signal to equalize all the mutual capacitances.

Then, after autotuning the flexible touchscreen 102, the pure raw data corresponding to the mutual capacitances may be set as the baseline strength and be saved in memory. Advantageously, pure raw data is not changed in memory unless the host 114 requests for it to be updated. This process may be performed as needed to determine the folding angle θ.

Referring to FIG. 5B, table 540 illustrates the self-sense strength (i.e., current raw data) in a fully open state (180° folding angle θ) and the self-sense strength in a half-open state (90° folding angle θ). The pure raw data sensed by the flexible touchscreen 102 may be converted to a pure differential by subtracting the current raw data from the pure raw data. For example, the current raw data across the folding area 108 detected in the fully open state (180° folding angle θ) or in the half-open state (90° folding angle θ) may be used to determine the pure differential by subtracting the current raw data from the pure raw data [Pure Differential=Pure Raw−Current Raw]. The pure differential may be used to determine a pure strength by adding an absolute value of a first sense line (e.g., Rx20) in the folding area 108 and an absolute value of a second sense line (e.g., Rx22) in the folding area 108. For example, where the first sense line is Rx20 and the second sense line is Rx22 in the folding area 108, [Pure Strength=ABS(Rx20 Pure Differential)+ABS(Rx22 Pure Differential)]. Advantageously, and as described above, using pure raw results in a more accurate self-sensing strength. While the Referring to FIG. 5C, graph 550 illustrates a visual representation of the pure strengths of the device with a 90° folding angle. The pure raw data line 552 illustrates the pure raw data for sense lines in the folding area (e.g., Rx20 and Rx22). The raw data line 554 illustrates the raw data for sense lines Rx20 and Rx22 collected in the half-open state (90° folding angle). The difference between the pure raw data line 552 and the raw data line 554 represents the pure differential for the respective sense lines. The sum of the absolute value of the pure differentials (i.e., ABS(−783) and ABS(729)) represent the pure strength for the half-open state (90° folding angle). In one or more embodiments, the pure strength may be the sum of an absolute value of the two largest differences between the baseline strength and the self-capacitances in the folding area.

Figure 6A:
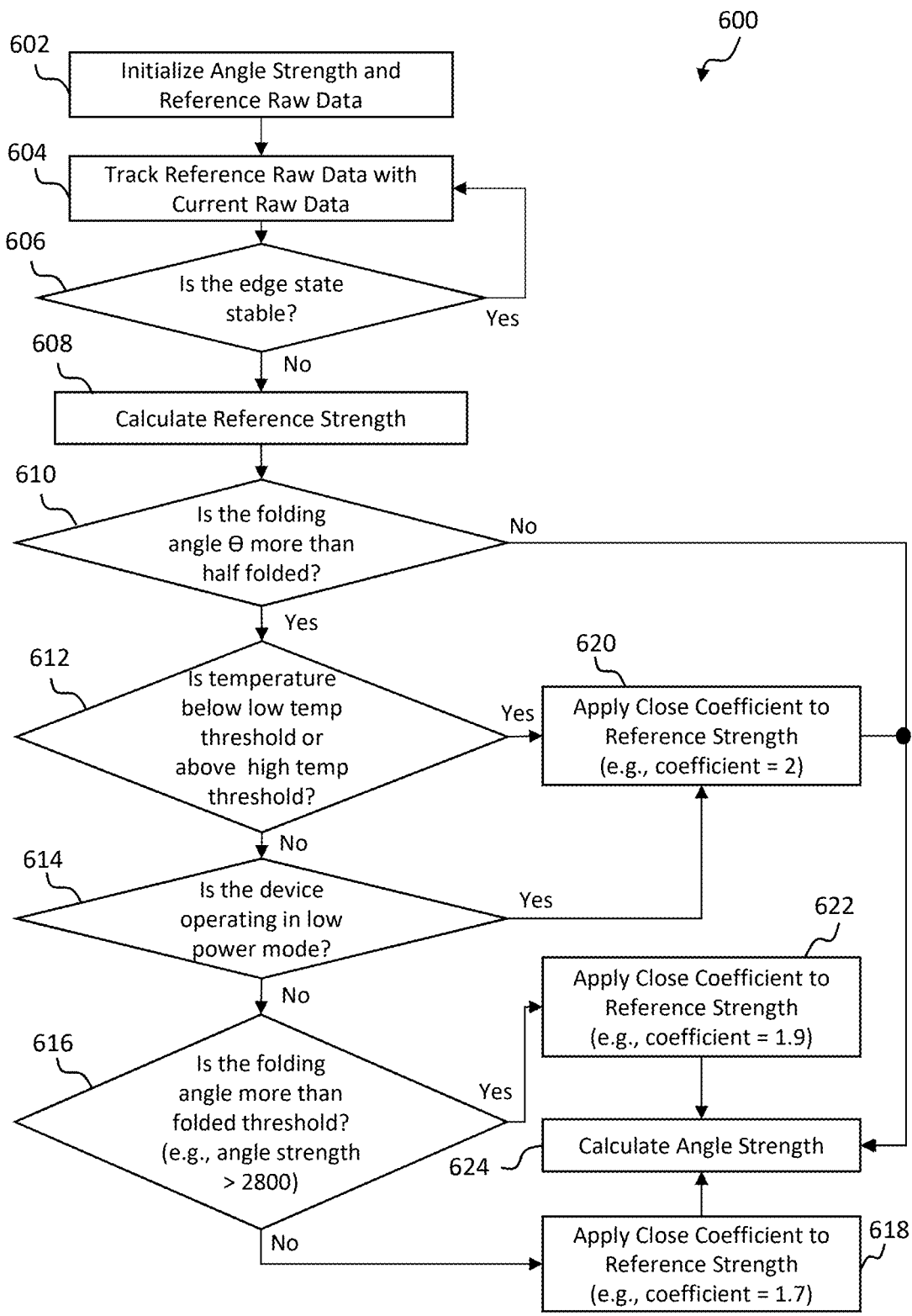
FIGS. 6A-6B illustrate process flows of determining an angle strength in an electronic device to determine its folding state according to an embodiment of the present application.
Figure 6B:
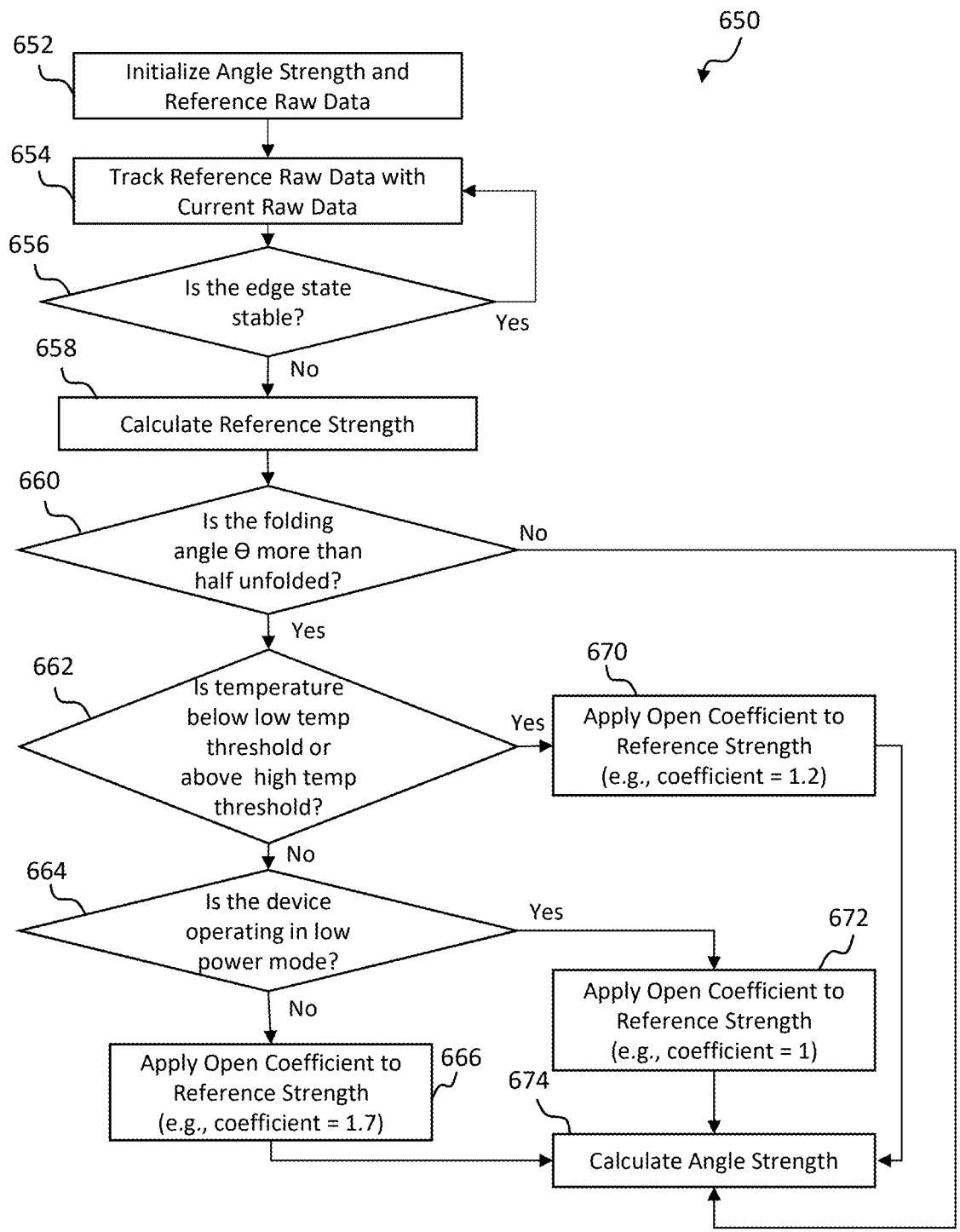

FIGS. 6A-6B illustrate process flows of determining an angle strength in an electronic device to determine its folding state according to an embodiment of the present application. FIG. 6A shows a process flow 600 of determining the angle strength based on a close coefficient when a lid of the device is closing and FIG. 6B shows a process flow 650 of determining the angle strength based on an open coefficient when the lid of the device is opening. The corresponding steps of FIGS. 6A and 6B will be described together below.

As illustrated in steps 602 and 652, the process begins by initializing an angle strength and a reference raw value. The angle strength is initialized to the pure strength in a first frame scan and the reference raw data is initialized to the current raw data as described above in FIGS. 5B and 5C. For example, as calculated in FIG. 5B, when the pure strength value is 1512 and the angle strength is initialized to 1512. Similarly, the reference raw data for sense line Rx20 is initialized to the current raw data value 804 and the reference raw data for sense line Rx22 is initialized to the current raw data value −676.

After initialization, the reference raw data tracks the current raw data according to an edge state in steps 604 and 654. The edge state includes three edge states: stable (or edge stable), detect (or edge detect), and release (or edge release). The stable state indicates that the reference raw tracks the current raw for each AutoCal Frame Count. The detect state and release state indicates that the reference raw data tracks the current RAW after calculating the angle strength.

As the reference raw tracks the current raw data, the process flows to step 606 and 656 to determine if the edge state is stable. When the edge state is stable, the process returns to steps 604 and 654 and the reference raw data continues to track the current raw data. When the edge state is not stable, the process continues to steps 608 and 658 to calculate a reference strength. The reference strength is a sum of an absolute value (ABS) of a difference between the reference raw (Ref Raw) and the current raw (Raw) of the first sense line (e.g., Rx20) and a difference between the reference raw and the current raw of the second sense line (e.g., Rx22). For example, where the first sense line is Rx20 and the second sense line is Rx22 in the folding area 108, [Reference Strength=ABS(Rx20 Ref Raw−Rx20 Raw)+ABS(Rx22 Ref Raw−Rx22 Raw)].

After calculating the reference strength in steps 608 and 658, the process flows to step 610 in FIG. 6A to determine if the folding angle θ is more than half folded or to step 660 in FIG. 6B to determine if the folding angle θ is more than half unfolded. In one or more embodiments, a fully folded position may be when the folding angle θ is 0°, a half-folded position may be when the folding angle θ is 90°, and a fully unfolded position may be when the folding angle θ is 180°. For example, when the folding angle θ is between 0°<θ<90° the folding angle is more than half folded and when the folding angle is 90°<θ<180° the folding angle is more than half unfolded.

Referring to FIG. 6A, when the folding angle is more than half folded (Step 610=Yes), the process flows to step 612 to perform a temperature check, step 614 to determine if the device is operating in low power mode, and step 616 to determine whether the folding angle is more than a folded threshold. Referring to FIG. 6B, when the folding angle is more than half unfolded (Step 670=Yes), the process flows to step 662 to perform a temperature check and step 664 to determine if the device is operating in low power mode.

In steps 612 and 662, the temperature check is performed to determine if the device temperature is below a low temperature threshold or above a high temperature threshold. If the temperature is outside the threshold ranges (i.e., below the low temperature threshold or above the high temperature threshold) (Step 612/662=Yes), the process flows to step 620 to apply a close coefficient or to step 670 to apply an open coefficient to the reference strength. The coefficient may include a close coefficient value to compensate for the temperature and an open coefficient value to compensate for the temperature. For example, the close coefficient value to compensate for the temperature may be set to 2, as shown in FIG. 6A, and the open coefficient value to compensate for the temperature may be 1.2, as shown in FIG. 6B.

If the temperature is within the normal range (i.e., between the low temperature threshold and the high temperature threshold), the process flows to steps 614 or 664 to determine if the device is operating in low power mode.

Referring to FIG. 6A, if the device is operating in low power mode (Step 614=Yes), the process flows to step 620 to apply the close coefficient to the reference strength. In one or more embodiments, the close coefficient value when the device is operating in low power mode may be a same close coefficient value to compensate for the temperature. For example, the close coefficient value for low power mode may be set to 2, as shown in FIG. 6A.

If the device is not operating in low power mode (Step 614=No), the process flows to step 616 to determine if the folding angle is more than a folded threshold. The folded threshold is a folding angle threshold that corresponds to an angle strength threshold. For example, a folded threshold may have an angle strength value of 2800. If the angle strength exceeds the angle strength value for the folded threshold in step 616 (Step 616=Yes), the process flows to step 622 to apply a close coefficient. If the angle strength does not exceed the angle strength value for the folded threshold in step 616 (Step 616=No), the process flows to step 618 to apply a close coefficient. The close coefficient of steps 620, 622, and 618 may have the same value or different values. For example, the close coefficient value when the folding angle is more than the folded threshold may be set to 1.9 (Step 622) and the close coefficient value when the folding angle is not more than the folded threshold may be set to 1.7 (Step 618).

Referring to FIG. 6B, if the device is operating in low power mode (Step 664=Yes), the process flows to step 672 to apply an open coefficient to the reference strength. For example, the open coefficient for low power mode may be 1, as shown in FIG. 6B. If the device is not operating in low power mode (Step 664=No), the process flows to step 666 to apply an open coefficient to the reference strength. If the device is operating in low power mode (Step 664=Yes), the process flows to step 672 to apply an open coefficient to the reference strength. The open coefficient of steps 666, 670, and 672 may have the same value or different values. For example, the open coefficient value when the device is in low operating mode may be set to 1 and the open coefficient value when the device is not in low operating mode may be set to 1.7.

While the process flows of FIGS. 6A-6B show steps 612, 614 and 618 and steps 662 and 664 occurring consecutively, these steps may occur simultaneously or in any order. In other words, when any one of the temperature check 612 and 662, power mode check 614 and 664, or folding angle threshold check 616 applies (i.e., =Yes), the coefficient is applied to or multiplied with the reference strength.

The process flow of FIGS. 6A-6B ends in steps 624 and 674, respectively. In steps 624 and 674, an angle strength is calculated. The angle strength can be used to determine when the device lid is closing or opening. In one or more embodiments, when the device is in an open state, the device can determine that the lid is closing as the angle strength approaches a close threshold strength. Similarly, when the device is in a close state, the device can determine that the lid is opening when the angle strength approaches an open threshold strength. For example, the device lid may be closing when the angle strength is greater than the close threshold strength of 1500 and the device lid may be opening when the angle strength is less than the open threshold strength of 1500.

Referring to FIG. 6A, when the folding angle is not more than half folded (Step 610=No), the process flows to step 624 to calculate the angle strength without applying the close coefficient to the reference strength. When the folding angle is more than half folded and after the close coefficient is applied to the reference strength in steps 618, 620, and 622, the process flows to step 624 to calculate the angle strength with the close coefficient applied to the reference strength.

Referring to FIG. 6B, when the folding angle is not more than half unfolded (Step 660=No), the process flows to step 674 to calculate the angle strength without applying the open coefficient to the reference strength. When the folding angle is more than half unfolded and after the open coefficient is applied to the reference strength in steps 666, 670, and 672, the process flows to step 674 to calculate the angle strength with the open coefficient applied to the reference strength. In steps 624 and 674, the angle strength is adjusted based on the preceding calculations and checks and provides an updated measurement of the device's folding state. In steps 624 and 674, the process concludes by adding or subtracting the reference strength to/from the angle strength. The reference strength with the applied coefficient is added to or subtracted from the angle strength to calculate for an adjusted angle strength. For example, when the lid of the device is closing, the reference strength is added to the angle strength for the adjusted angle strength. For example, when a lid of the device is opening, the reference strength is subtracted from the angle strength for the adjusted angle strength.

FIGS. 7A-7D illustrate a process for detecting edge states in a foldable device based on pure strength values according to an embodiment of the present application.

Figures 7A, 7B, 7C:
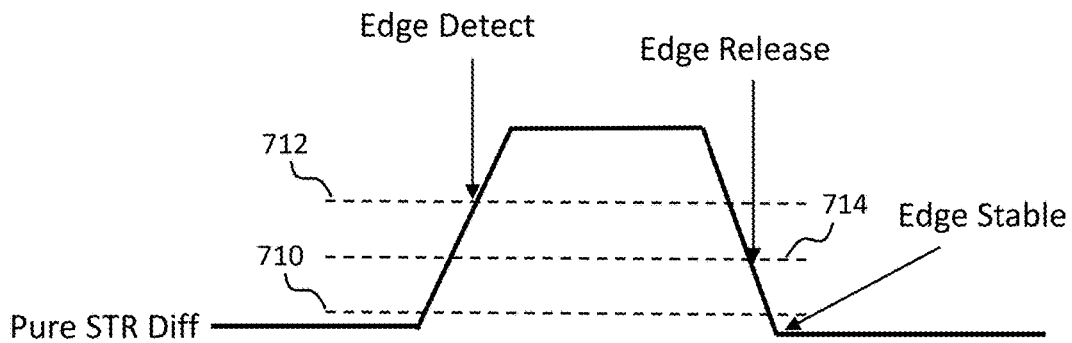
FIGS. 7A-7D illustrate a process for detecting edge states in a foldable device based on pure strength values according to an embodiment of the present application.

FIG. 7A illustrates a circular queue used for storing and managing pure strength values in a foldable device according to embodiments of the present application.

The circular queue is represented as a table with 16 indices, numbered from 0 to 15. Each index corresponds to a specific time point or frame in the device's operation. When the pure strength value is calculated as described above in FIGS. 5B-5C, the pure strength value is stored in the circular queue. The pure strength values (Pure STR) stored in the circular queue represents measurements of the pure strength at different frames. As new pure strength values are calculated, the new pure strength value is added to the queue and the oldest value is overwritten when the queue is full. The pure strength values in the queue show variations that correspond to the difference between the raw value of the current frame and the pure raw value of the first frame.

In various embodiments, a pure strength differential (Pure STR Diff) can be used to determine the edge state of the foldable device. The pure strength differential is calculated based on the pure strength values stored in the circular queue. The pure strength differential is an absolute value of the difference between a sum of a first stored set of pure strength values based on the current index (e.g., "old" pure strength values stored in indices 8 through 15) and a sum of a second stored set of pure strength values based on the current index (e.g., "new" pure strength values stored in indices 0 through 7). For example, referring to the pure strength values shown in FIG. 7A, when the current index is 7, the sum of the first stored set of pure strength values is 1658 and the sum of the second stored set of pure strength values is 2112. The pure strength differential is equal to ABS(1658-2112) or 454.

FIG. 7B illustrates a table containing three edge states: Stable, Detect, and Release. The edge states transitions between these states based on a current edge state of the device, the pure strength differential calculated from the pure strength values stored in the circular queue, and an edge threshold for the next edge state. The edge thresholds include a detect threshold, a release threshold, and a stable threshold. The edge state initializes to stable in the first frame. When the current edge state is stable and the pure strength differential is greater than the detect threshold, the edge state changes to detect. The detect threshold may be a value between 135 and 165, for example, 150. When the current edge state is detect and the pure strength differential is greater than the release threshold, the edge state changes to release. The release threshold may be a value between 45 and 55, for example, 50. When the current edge state is release and the pure strength differential is less than the stable threshold, the edge state changes to stable. The stable threshold may be a value between 25 and 35, for example, 30.

When the pure strength differential does not meet the change condition for the current state, the edge state remains in the current state. For example, when the edge state is stable and the pure strength differential is not greater than the detect threshold, the edge state remains stable.

FIG. 7C illustrates an exemplary diagram representing a pure strength differential and edge state thresholds of a foldable device. The pure strength differential begins in the stable state (i.e., the pure strength differential is less than the stable threshold 710), when the pure strength differential exceeds the detect threshold 712, the edge state transitions to the detect state. In the detect state, when the pure strength differential exceeds the release threshold 714, the edge state transitions to the release state. In the release state, when the pure strength differential is less than the stable threshold, the edge state transitions to the stable edge state.

Figure 7D:
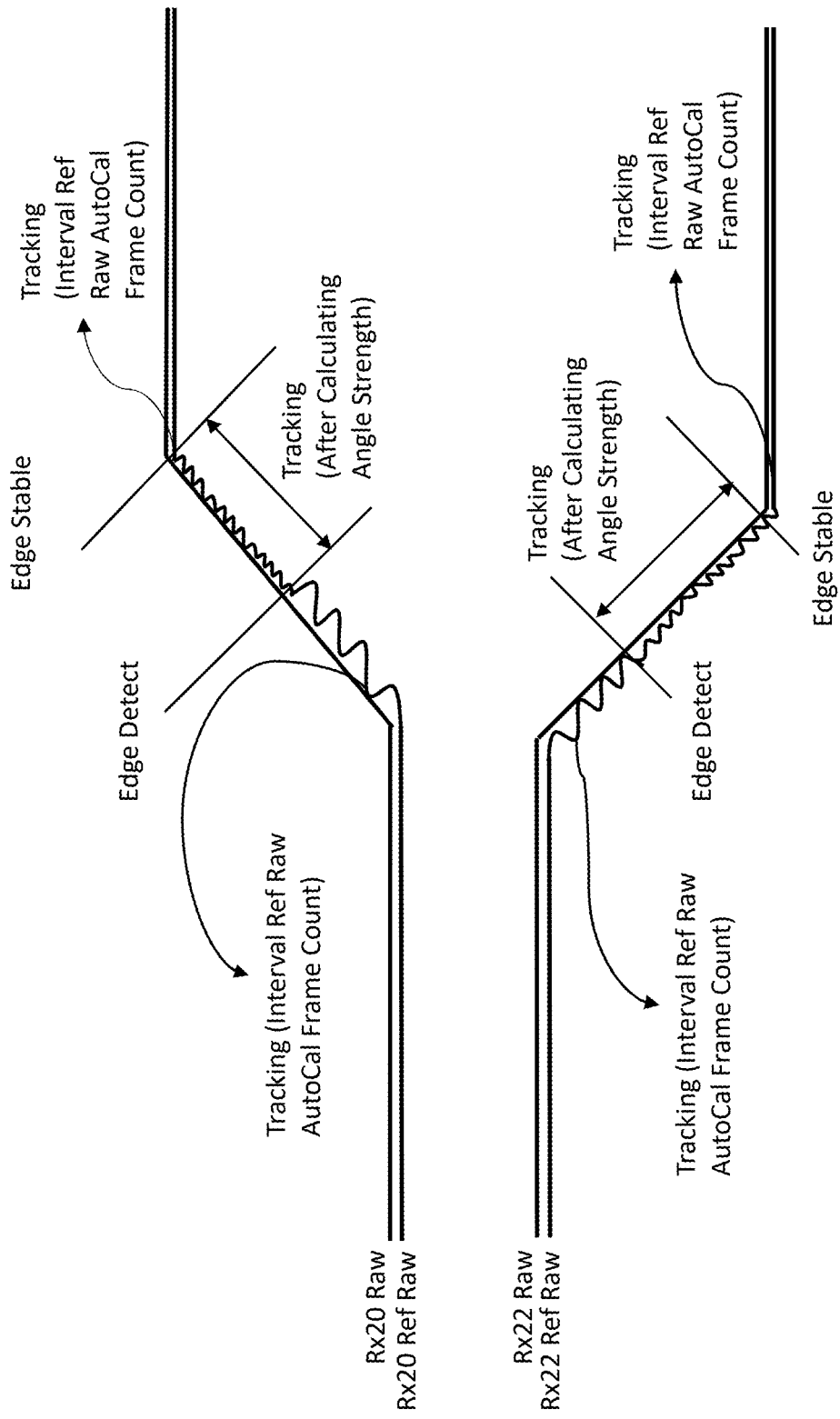

FIG. 7D illustrates an exemplary diagram of raw data and reference raw data tracking by an edge state according to an embodiment of the present application. The self-sense strength or raw data in the folding area 108 can be used to track an edge state of the electronic device 100. The raw data (Raw) and reference raw data (Ref Raw) for sense line Rx20 and sense line Rx22 are shown. After initialization, the reference raw data (Ref Raw) tracks the current raw data (Raw) according to the edge state. When the edge state is stable, the reference raw data tracks the current raw data at each auto-calculated (AutoCal) frame count interval. In other words, the edge state is stable when self-capacitances in the folding area is steady for a duration of time and the device is not actively folding or folding. When the edge state is detect or release, the reference raw data tracks the current raw data immediately after calculating an angle strength. In other words, the edge state is detect or release when the device is actively folding or unfolding.

Referring to FIG. 7D, for example, when the lid is closing, the reference raw tracks the current raw data at each AutoCal frame count interval. When the edge state transitions to edge detect, the reference raw tracks the current raw data after calculating the angle strength.

FIGS. 8A-8C illustrate exemplary implementation of calculating reference strengths and angle strengths in a foldable device according to an embodiment of the present application. FIGS. 8A-8C presents a table with raw data measurements and calculations for two reference points, Rx20 and Rx22, corresponding to sense lines in the folding area of the device.

FIGS. 8A-8C shows an exemplary implementation of calculating a reference strength as described above in step 608 of FIG. 6. The reference strength is the sum of an absolute value of a reference differential (Ref Differential) for a first sense line (e.g., Rx20) in a folding area and an absolute value of a reference differential for a second sense line (e.g., Rx22). The reference differential is a difference between the reference raw value (Ref Raw) and the current raw value (Raw). The reference raw data tracks the raw data based on the edge state as described in FIG. 7D.

FIG. 8A shows a set of reference raw and current raw measurements the represent strength values collected during a frame scan for a folding state of a foldable device. Referring to FIG. 8A, the table shows reference raw values of 379 and −150 for Rx20 and Rx22 respectively, with corresponding current raw values of 400 and 168. The reference differential is calculated as the difference between current raw value and reference raw values. Thus, the reference differential is −21 for sense line Rx20 and 18 for sense line Rx22. The reference strength is then computed as the sum of the absolute values of the reference differentials, yielding 39.

FIG. 8B shows another set of reference raw and current raw measurements that represent strength values collected during another frame scan for a folding state of a foldable device. Referring to FIG. 8B, the table shows reference raw values of 902 and −658 for Rx20 and Rx22 respectively, with corresponding current raw values of 888 and −646. The reference differential calculations yield 14 and −12. Thus, the reference strength is ABS(14)+ABS(−12)=26.

FIG. 8C shows another set of reference raw and current raw measurements that represent strength values collected during a frame scan for a folding state of a foldable device where a coefficient is applied to a reference strength. The correction coefficient may include an open coefficient and a close coefficient. The open coefficient may be applied to the reference strength when the lid is more than half unfolded (i.e., lid opening) and the close coefficient may be applied to the reference strength when the lid is more than half folded (i.e., lid closing).

As described in FIG. 6, the coefficient is applied to the reference strength when the folding angle is between $0°<\theta<90°$ or between $90°<\theta<180°$ in step 610, when the device temperature is below a low temperature threshold or above a high temperature threshold in step 612, or when device is operating in low power mode in step 614.

Referring to FIG. 8C, the table shows reference raw values of 1523 and −1251 for Rx20 and Rx22 respectively, with corresponding current raw values of 1529 and −1262. The reference differential calculations yield −6 and 11. The reference strength is ABS(−6)+ABS(−11)=17 and the applied coefficient is 1.9. For example, the reference strength calculation includes the coefficient or multiplier of 1.9, resulting in a value of 32. FIG. 8C includes an angle strength calculation as described in step 618 in FIG. 6. When the device is in a more than half folded state (i.e., lid closing), the reference strength is added to the angle strength for an adjusted angle strength. When the device is in a more than half unfolded state (i.e., lid opening), the reference strength is subtracted from the angle strength for the adjusted angle strength. In this embodiment, the reference strength with the applied coefficient is added to the angle strength. Thus, the angle strength is 2854+32=2886. The angle strength can be used to determine that the folding state of the device has changed.

Figure 9A:
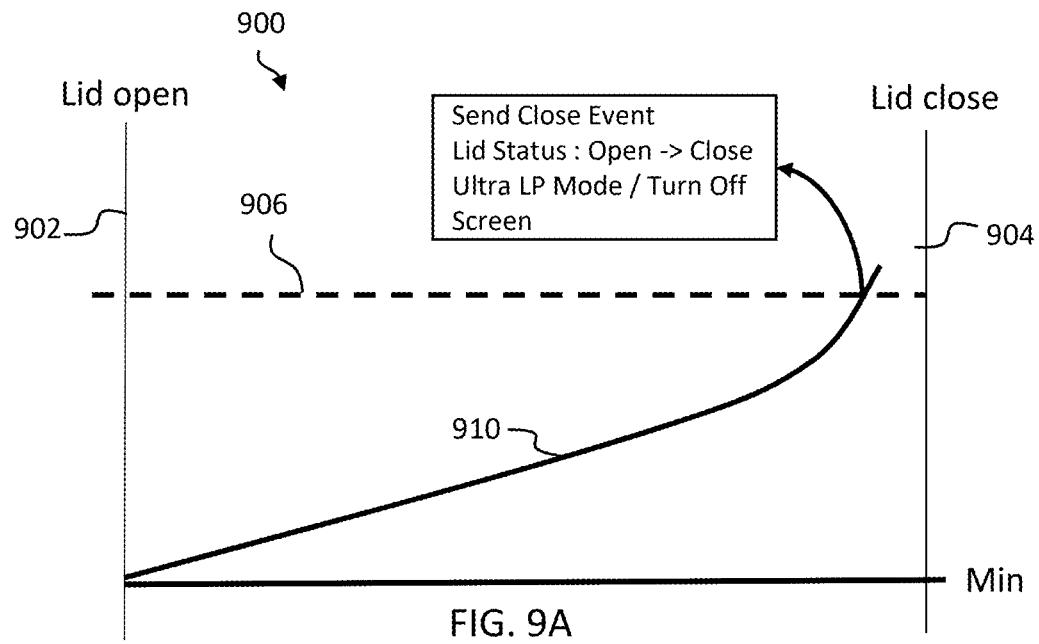
FIGS. 9A-9B illustrate graphical representations of angle strengths for a foldable device according to an embodiment of the present application.
Figure 9B:
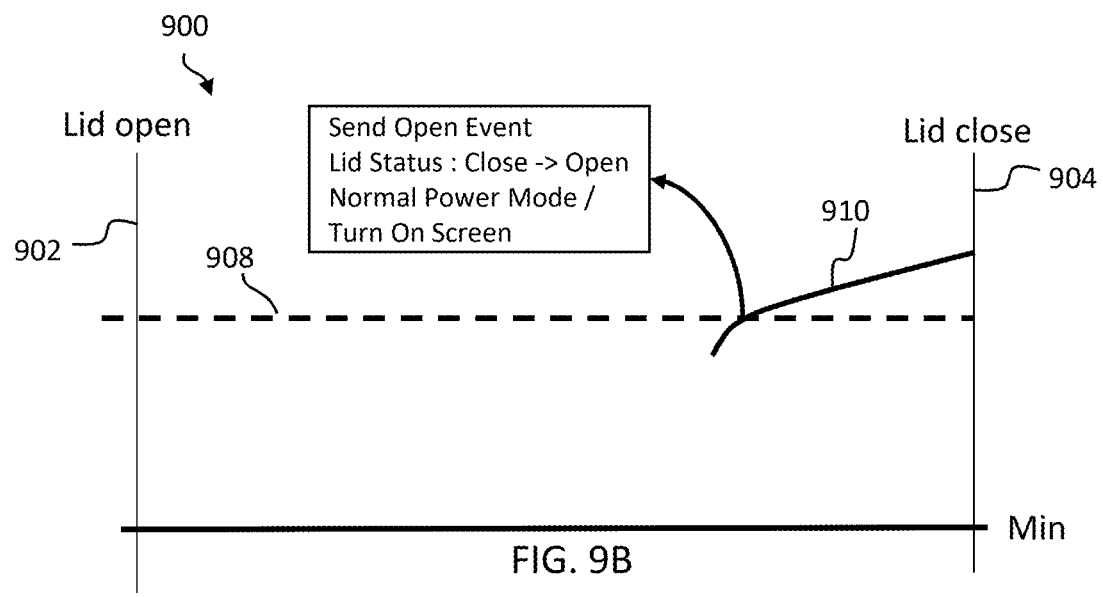

FIGS. 9A-9B illustrate graphical representations of angle strengths for a foldable device according to an embodiment of the present application.

FIG. 9A shows a graphical representation 900 of the angle strength 910 for the foldable device beginning in a lid open state 902 or having a lid status of opened. In one or more embodiments, the angle strength 910 increases as the lid moves from open to close. When the angle strength reaches a close threshold 906 while in the lid open state 902, the touchscreen controller sends a lid close event to the host that indicates that the foldable device is in a lid close state 904. The device can then operate in ultra low power mode (Ultra LP) or the display can turn off to preserve power. In ultra low power mode, the touchscreen controller can continue to scan in order to detect a change to the lid status. In addition, ultra low power mode can minimize power consumption by only performing self-sensing.

FIG. 9B shows a graphical representation 900 of the angle strength 910 for the foldable device beginning in a lid close state 904 or having a lid status of closed. In one or more embodiments, the angle strength 910 decreases as the lid moves from close to open. When the angle strength reaches an open threshold 908 while in a lid close state 904, the touchscreen controller sends a lid open event to the host that indicates that the foldable device is in a lid open state 902 where the lid is at least partially open. The device can then operate in normal power mode and turn on the display.

Figure 10:
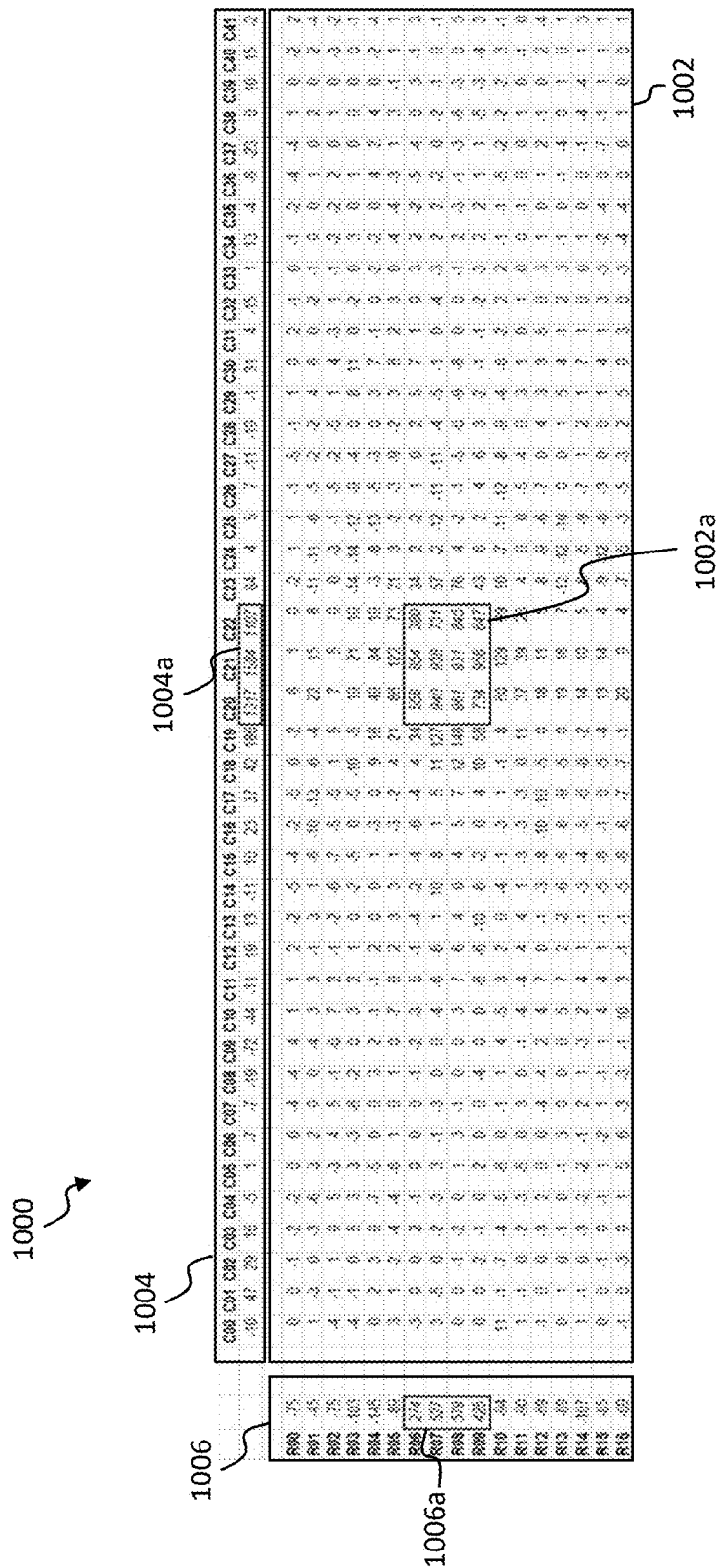
FIG. 10 illustrates an exemplary electronic readout of capacitive strengths detected by the foldable device that includes strengths detected from a mutual sensing scan and a self-sensing scan according to embodiments of the present application.

FIG. 10 illustrates an exemplary electronic readout of capacitive strengths detected by the foldable device that includes strengths detected from a mutual sensing scan and a self-sensing scan according to embodiments of the present application.

The electronic readout 1000 includes strength values arranged as mutual strengths 1002, self-sense strengths 1004, and self-force strengths 1006. FIG. 10 shows the strength values of a touch or selection in the folding area of the device. The self-sense strengths 1004 can be used to detect a change in capacitance when the device is folding. Similarly, when a capacitive object, such as, a user touch input, is brought proximate to or touches the folding area of the touchscreen, the change in capacitance may also be detected. Unlike the change in capacitance when the device is folding, the mutual strength 1002 and the force strength 1006 changes, in addition to the self-sense strengths 1004, when touch is detected in the folding area. For example, referring to FIG. 10, the mutual strength values 1002a, the self-force strength values 1006a, and the self-sense strength values 1004a in the folding area changes when touch is made in the folding area, whereas the mutual strength values and the self-force strength values do not change as shown in FIG. 2A. Thus, the device can distinguish between touch strength and folding strength in the folding area.

Figure 11A:
FIGS. 11A-11B illustrate representations of validating a folding angle based on self-strength profiling in accordance with an embodiment of the present application.
Figure 11B:
Figure 11B:
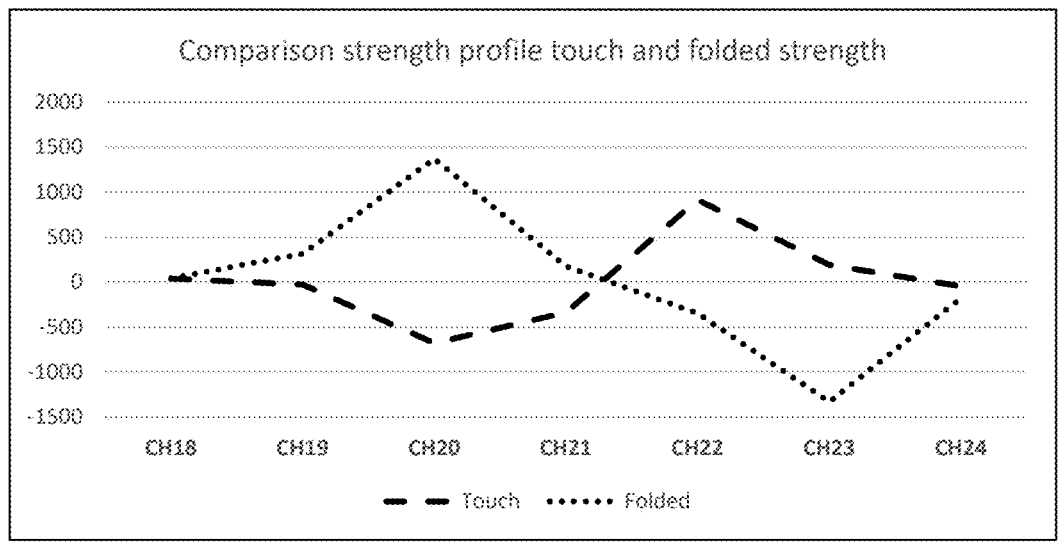

FIGS. 11A-11B illustrate representations of validating a folding angle based on self-strength profiling in accordance with an embodiment of the present application. FIG. 11A shows a table of strength values in the folding area for touch strength and fold strength. FIG. 11B shows a comparison strength profiling for the touch strength and the folded strength.

As illustrated in table 1102 in FIG. 11A and graph 1104 in FIG. 11B, self-strength profiling involves the touchscreen controller evaluating the self-sense strengths. As illustrated in in table 1102 and graph 1104, whether the self-sense strengths correspond to a touch or the folding angle θ depends on the signs of the strengths on each side of the folding axis 107. For example, positive self-strength values on the first portion of the folding axis 107 may correspond to a touch and negative self-strength values may correspond to a fold (and vice versa). Therefore, based on the signs of the self-strengths, the touchscreen controller 110 may validate the folding angle θ. Thus, the device can distinguish between the strength values of a user's touch input or the act of folding the device. This differentiation allows for proper interpretation of user inputs regardless of the device's current folded state.

As described above, in order to switch from the raw data domain to the strength domain, as understood by those with ordinary skill in the art, the touchscreen controller may convert the raw data values to strengths by subtracting a raw data from a corresponding baseline value.

Figure 12:
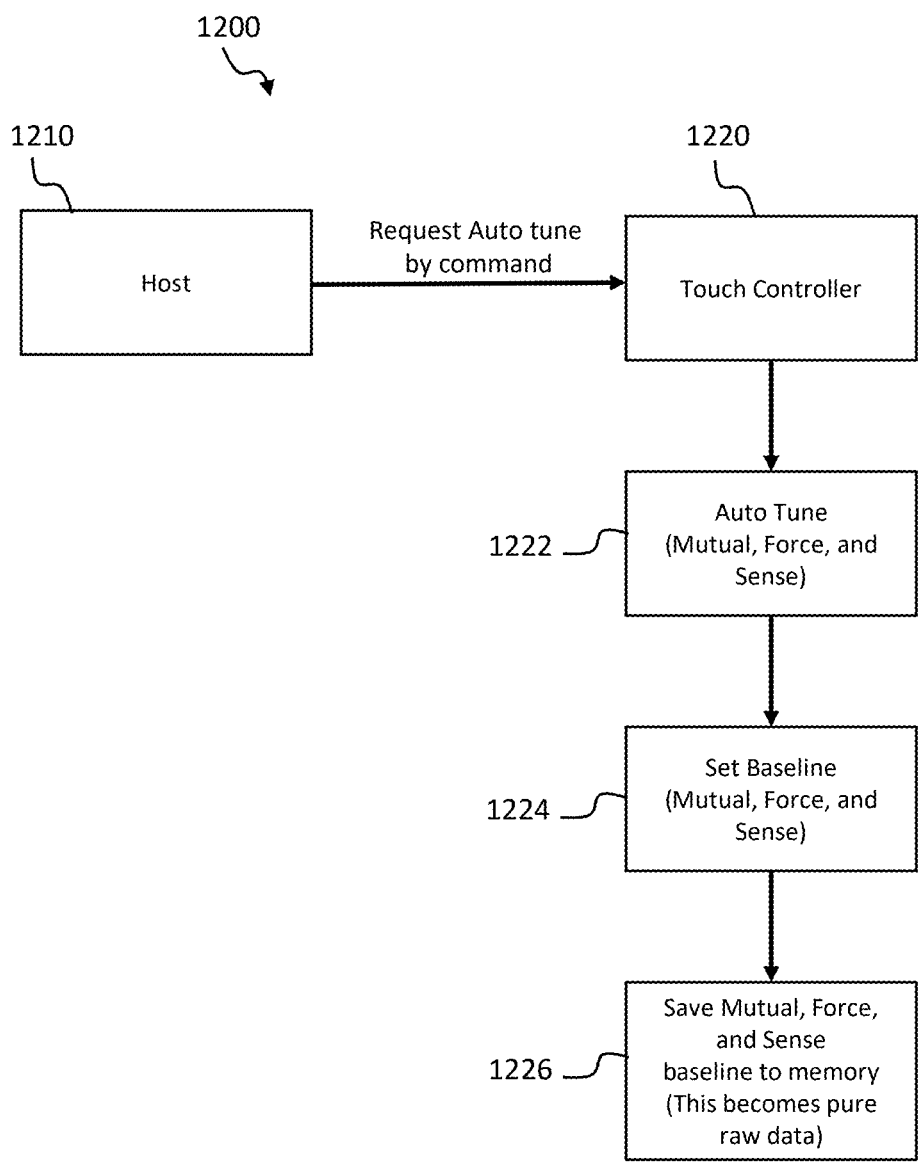
FIG. 12 illustrates a flowchart 1200 depicting the process of initializing baseline strengths by a host and touchscreen controller in a foldable device according to an embodiment of the present application.

FIG. 12 illustrates a flowchart 1200 depicting the process of initializing baseline strengths by a host and touchscreen controller in a foldable device according to an embodiment of the present application. The flowchart shows a host 1210 and a touchscreen controller 1220 creating the baseline strength to create strength to edge detection.

The process begins with the host 1210 initiating a request for auto-tuning to the touchscreen controller 1220. The request begins the calibration process at the touchscreen controller 1220. The touchscreen controller 1220 performs auto tune in step 1222 for mutual capacitance, sense capacitance, and force capacitance. In the auto-tuning step 1222, the touchscreen controller 1220 transmits an auto-tune signal to equalize the mutual, self, and force capacitances. In various embodiments, auto-tuning is performed when the device is in a fully open state or has a folding angle θ of 180°.

After auto tuning is complete in step 1222, the touchscreen controller 1220 sets the baseline in step 1224 for the mutual, force, and sense capacitances. The baseline capacitance may be set as a reference point against which future touch and fold detections can be measured.

When the baseline is set in step 1224, the touchscreen controller 1220 saves the baseline to memory (e.g., ROM). The baseline capacitances saved to memory becomes the pure raw data used to calculate pure strength used to detect the edge state as described in FIGS. 7A-7C.

FIGS. 13A-13D illustrates a flowchart 1300 of the process of detecting and managing the folding state a foldable device. The flowchart 1300 outlines a series of steps and decision points for initializing, tracking, and calculating various parameters related to determining the folding state of the device.

Figure 13A:
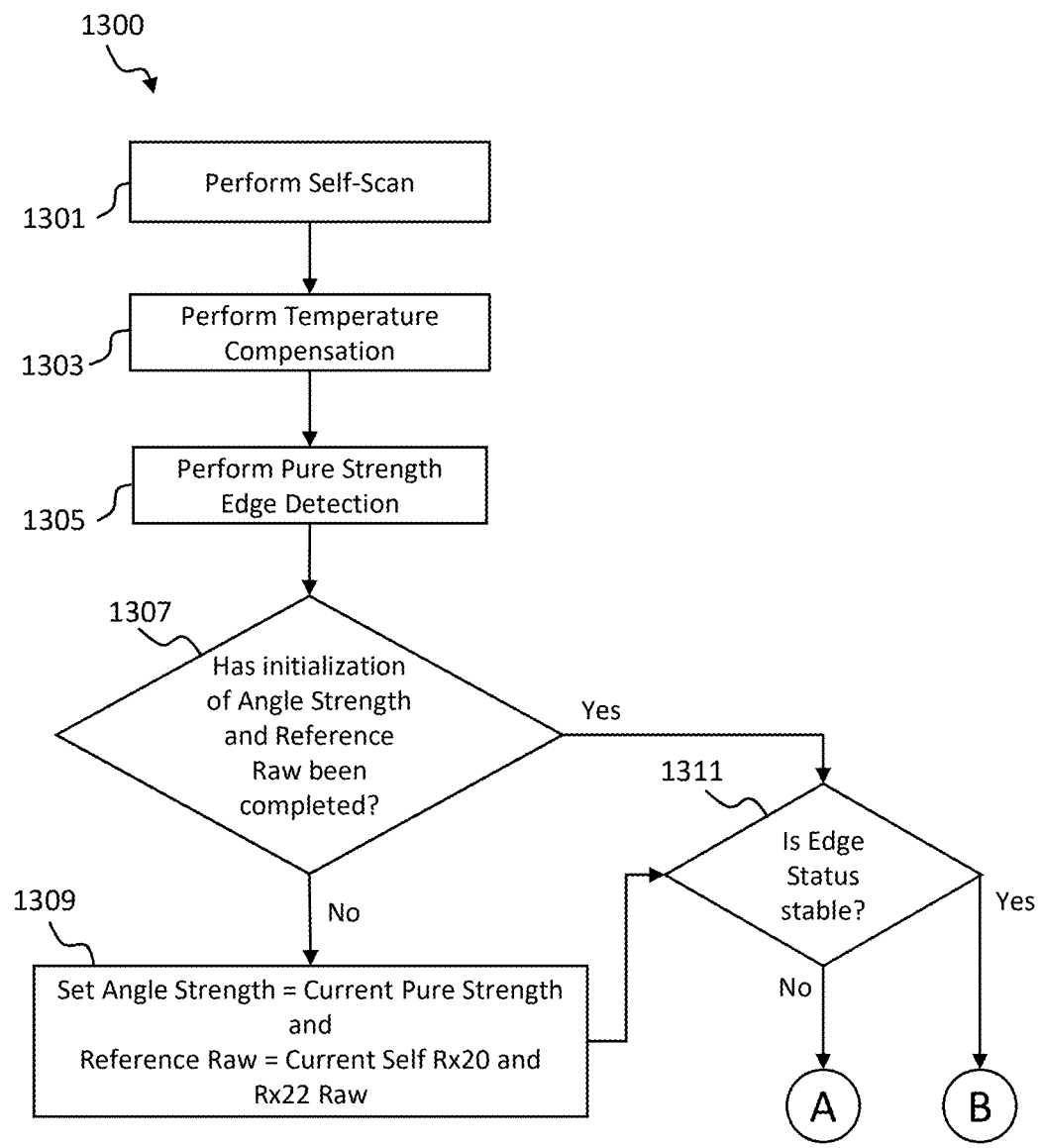
FIGS. 13A-13D illustrates a flowchart 1300 of the process of detecting and managing the folding state a foldable device.

Referring to FIG. 13A, in step 1301, the process begins with performing a self-scan. During the self-scan, the touchscreen controller drives the drive line 122 and scans the sense lines 120. The self-scan involves applying a small voltage to each touch electrode and measuring the resulting capacitance to determine the self-sensing raw data. In various embodiments, the self-scan captures the baseline capacitance values of electrodes located in a folding area 108 of the foldable device.

Following the self-scan step 1301, the process begins performing a temperature check in step 1303. In various embodiments, the temperature check may be determined by analyzing a change in the self-sense standard deviation as described in FIG. 4.

Following the temperature check in step 1303, the process begins performing a pure strength edge detection. In various embodiments, the pure strength edge detection includes determining the pure strength of the folding area of the device based on the capacitances collected during the self-scan in step 1301.

After performing the pure strength edge detection, the process continues to determine whether initialization of angle strength and reference raw data has been completed in step 1307. If the initialization of the angle strength and reference raw has not been completed, the touchscreen controller sets the angle strength to the current pure strength value and the reference raw value to the current raw value and continues to step 1311 to check whether the edge state is stable. For example, in step 1309, the angle strength is equal to the current pure strength and the reference raw value is equal to the current raw values for Rx20 and Rx22. If the initialization the angle strength and reference raw has been completed in step 1307, the touchscreen controller determines whether the edge state is stable in step 1311.

Figure 13B:
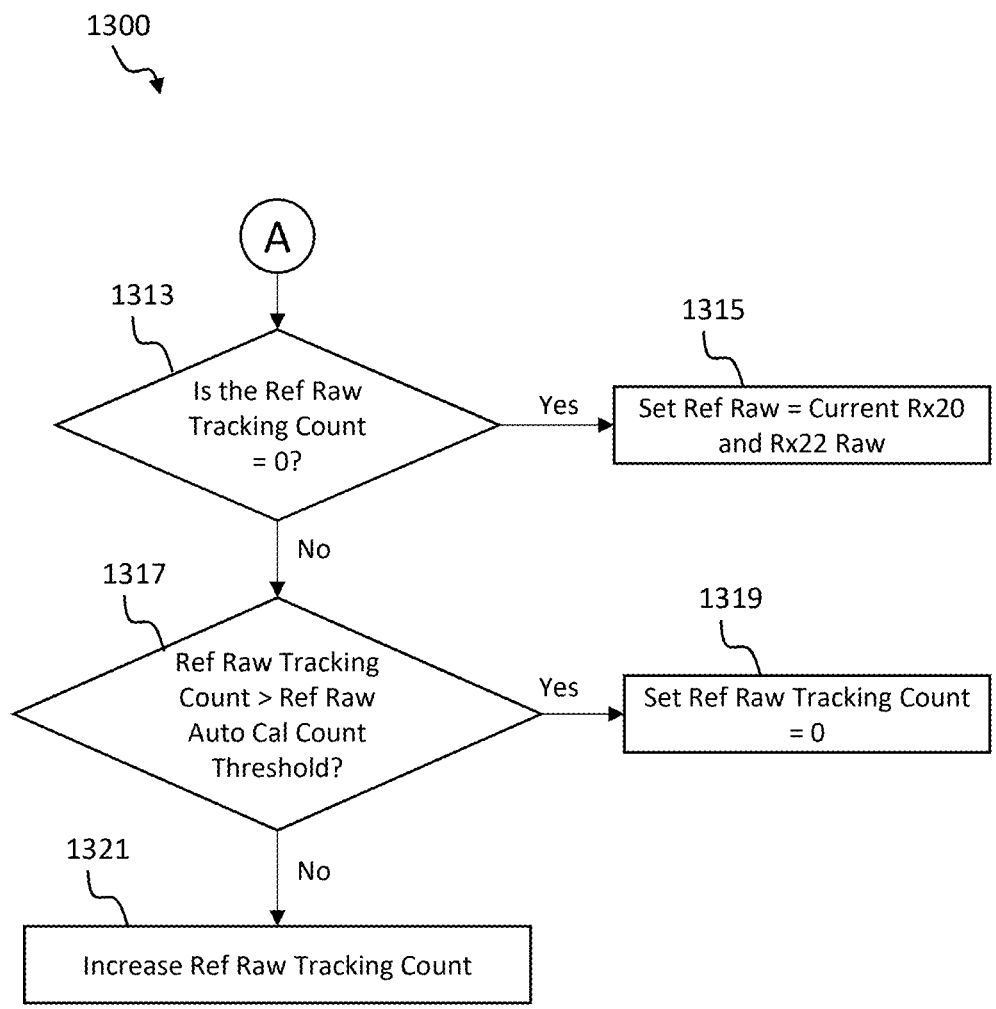

When the edge state is not stable in step 1311, the process continues to step 1313 to determine if the reference raw tracking count is equal to zero as shown in FIG. 13B. When the reference raw tracking count is equal to zero, the touchscreen controller sets the reference raw value equal to the current raw value of the senses lines in the folding area (e.g., Rx20 and Rx22) in step 1315. When the reference raw tracking count is not equal to zero in step 1313, the process flows to step 1317 to determine whether the reference raw tracking count is greater than a reference raw AutoCal count threshold. When the reference raw tracking count exceeds the reference raw AutoCal count threshold, the touchscreen controller resets the reference raw tracking count to zero in step 1319. When the reference raw tracking count does not exceed the reference raw AutoCal count threshold, the touchscreen controller increases the reference raw tracking count in step 1319.

Figure 13C:
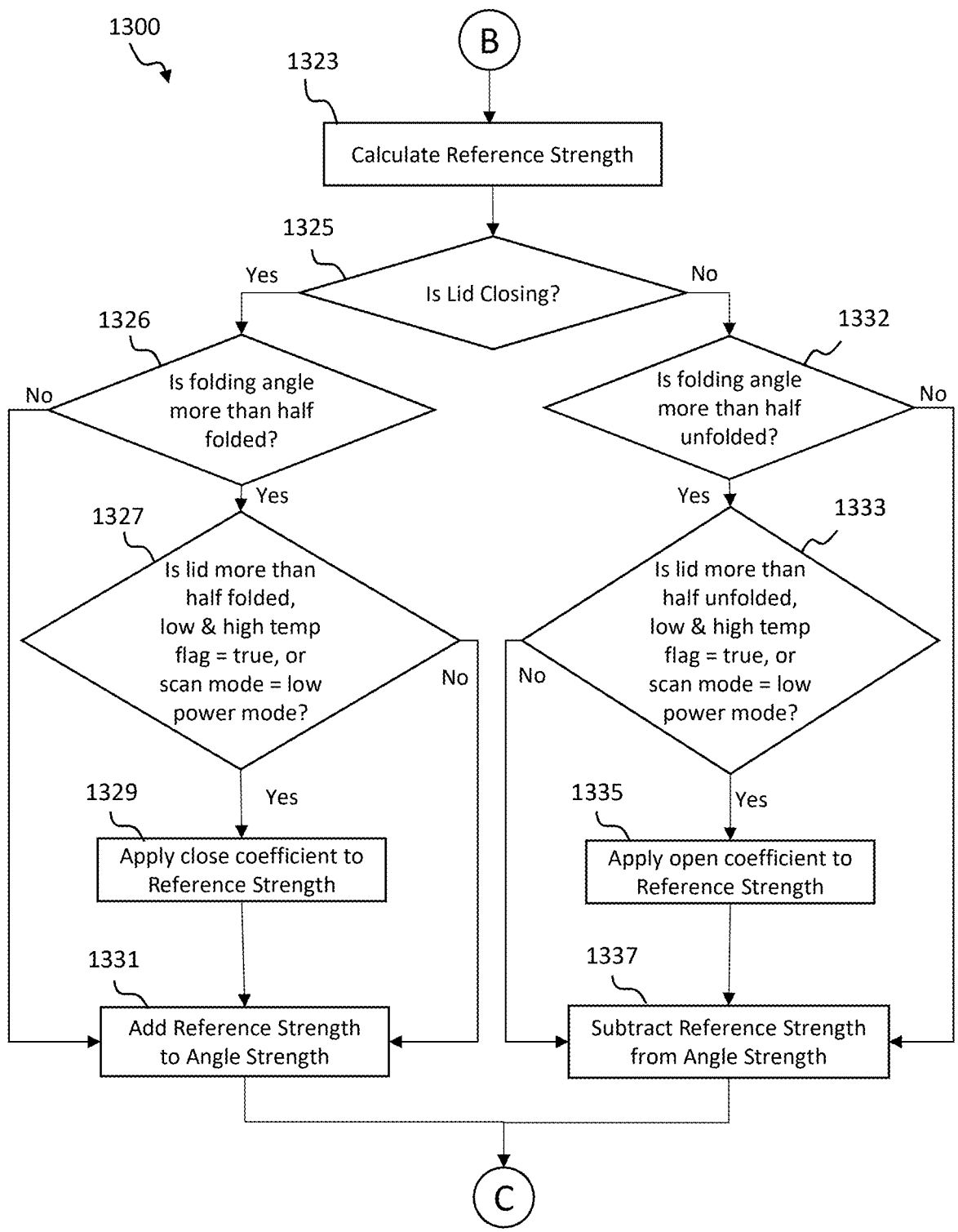

When the edge state is stable in step 1311, the process continues to step 1323 to calculate a reference strength as shown in FIG. 13C. After calculating the reference strength, the touchscreen controller determines whether the lid is closing in step 1325. For example, the lid is closing when the device is folding or the folding angle at the folding axis 107 is decreasing. The lid is not closing (i.e., opening) when the device is unfolding or the folding angle at the folding axis 107 is increasing.

If the lid closing, the touchscreen controller detects if the lid is more than half folded or the folding angle is less than 90 degrees in step 1326. If the folding angle is more than half folded, the touchscreen controller detects whether the lid is more than half folded, a low & high temperature flag is true, or a scan mode is in low power mode in step 1327. If one of these conditions applies (Step 1327=YES), a close coefficient is applied to the reference strength in step 1329. After applying the close coefficient to the reference strength in step 1329, the reference strength with the close coefficient applied is added to an angle strength in step 1331. If the folding angle is not more than half folded or the folding angle is between 90 degrees and 180 degrees (Step 1326=NO) or the conditions does not apply (Step 1327=NO), the reference strength without the close coefficient is added to the angle strength in step 1331.

If the lid is opening (i.e., not closing), the touchscreen controller detects if the lid is more than half unfolded or if the folding angle is greater than 90 degrees in step 1332. If the folding angle is more than half unfolded, the touchscreen controller detects whether the lid is more than half unfolded, a low & high temperature flag is true, or a scan mode is in low power mode in step 1333. If one of these conditions applies (Step 1333=YES), an open coefficient is applied to the reference strength in step 1335. After applying the open coefficient to the reference strength in step 1335, the reference strength with the open coefficient applied is subtracted from the angle strength in step 1337. If the folding angle is not more than half unfolded or the folding angle is between 0 degrees and 90 degrees (Step 1332=NO) or the conditions do not apply (Step 1333=NO), the reference strength without the open coefficient is subtracted from the angle strength in step 1337.

Figure 13D:
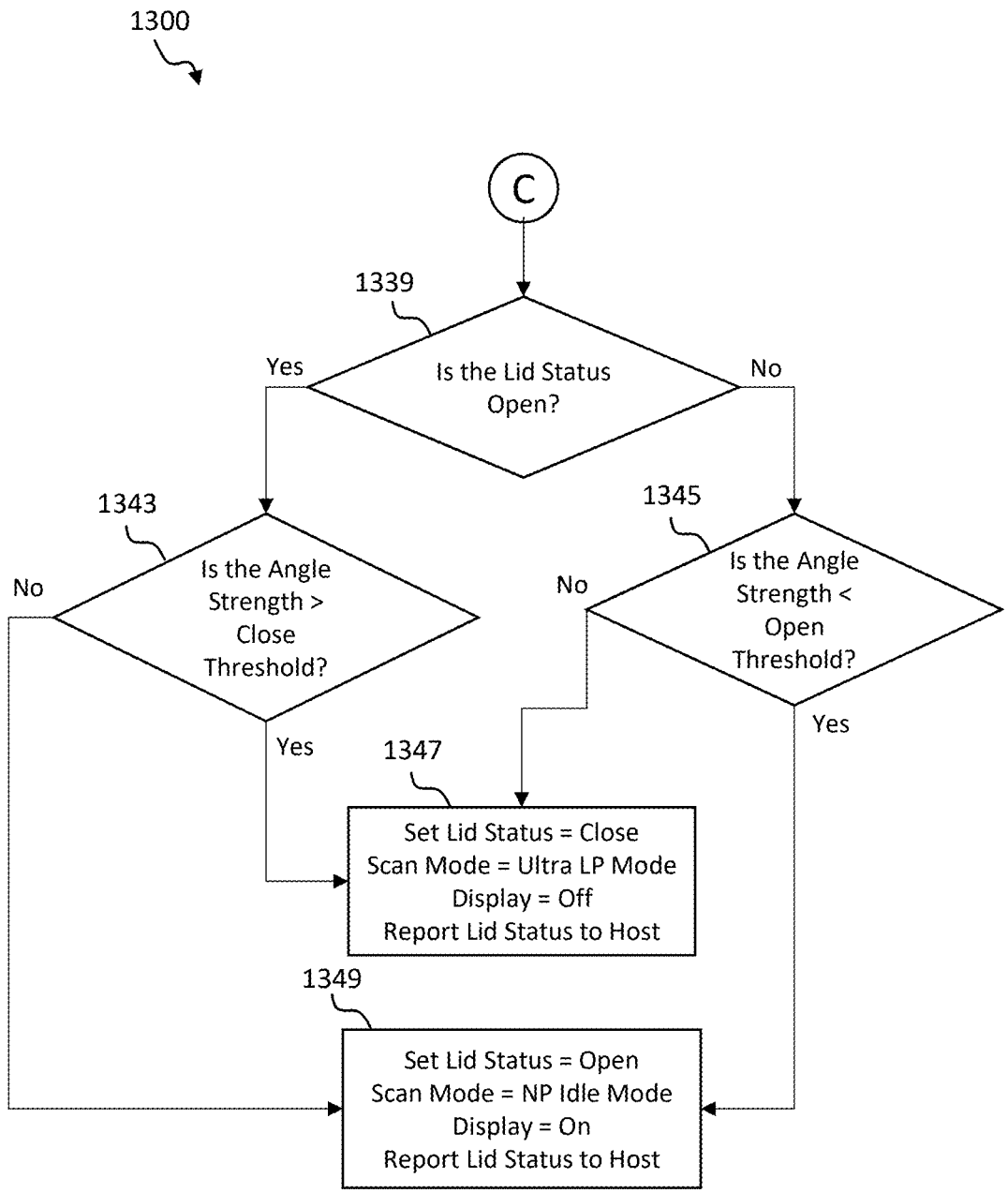

After calculating the angle strength in step 1331 or step 1337, the process continues to determine whether the lid status is open in step 1339 as shown in FIG. 13D. When the lid status is open in step 1339, the touchscreen controller proceeds to detect whether the angle strength is greater than a close threshold in step 1343. When the angle strength is greater than the close threshold in step 1343, the lid status is set to close and the lid status is reported to the host in step 1347. On the other hand, when the angle strength is less than the close threshold in step 1343, the lid status is set to open and the lid status is reported to the host in step 1349.

When the lid status is closed in step 1339, touchscreen controller proceeds to detect whether the angle strength is less than an open threshold in step 1345. When the angle strength is less than the open threshold in step 1345, the lid status is set to open and the lid status is reported to the host in step 1349. On the other hand, when the angle strength is greater than the open threshold in step 1345, the lid status is set to close and the lid status is reported to the host in step 1347.

In various embodiments, when the lid status is closed, a scan mode may be set to ultra low power mode and the touchscreen 102 may be turned off. On the other hand, when the lid status is open, the scan mode may be set to normal power idle mode and the touchscreen 102 may turn on.

Figure 14A:
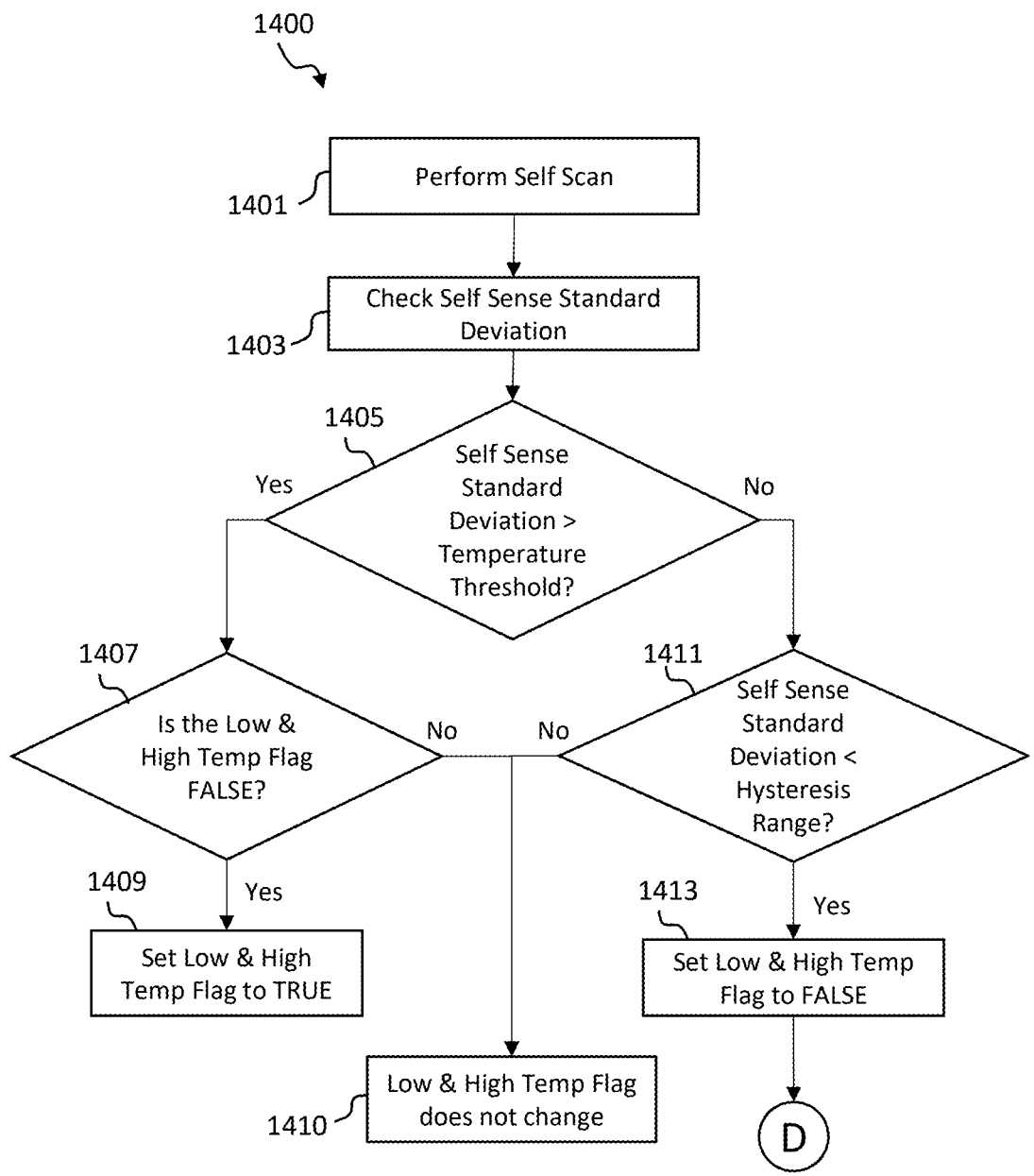
FIGS. 14A-14B illustrate a process for performing a temperature check and compensation according to an embodiment of the present application.
Figure 14B:
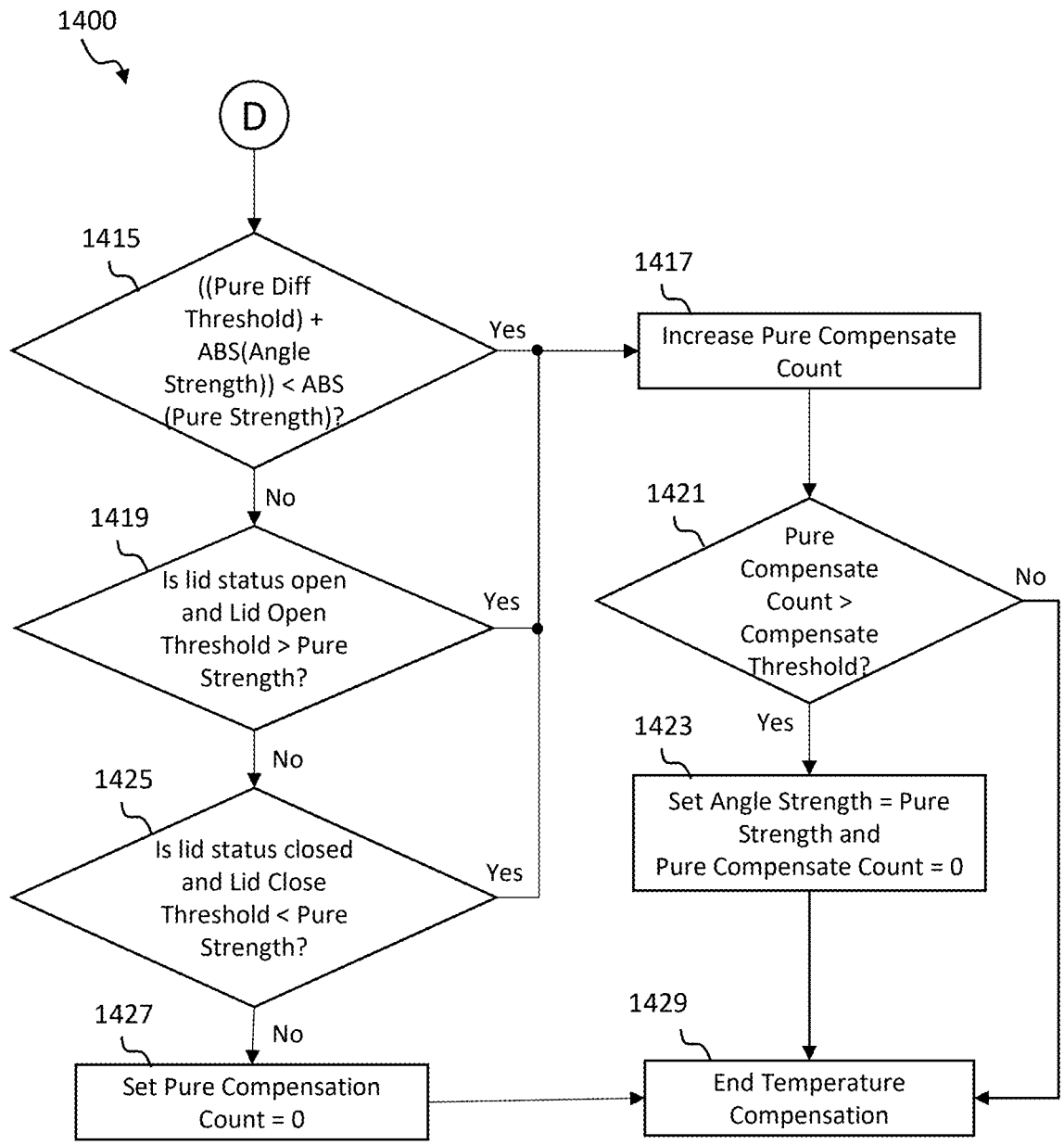

FIGS. 14A-14B illustrate a process for performing a temperature check and compensation according to an embodiment of the present application. The flowchart 1400 performs the temperature check by comparing a self-sense standard deviation and a temperature threshold.

Referring to FIG. 14A, the process begins with performing a self-scan in step 1401. During the self-scan, the touchscreen controller drives the drive line 122 and scans the sense lines 120. The self-scan involves applying a small voltage to each touch electrode and measuring the resulting capacitance to determine the self-sensing raw data. In various embodiments, the self-scan captures the baseline capacitance values of electrodes located in a folding area 108 of the foldable device.

The touchscreen controller then proceeds to check the self-sense standard deviation in step 1403. The self-sense standard deviation is determined by the self-sense raw data sensed by the sense lines 120 during a self-sensing scan. In low or high temperatures, the self-sense standard deviation gradually increases as shown in graph 402 of FIG. 4.

The process continues to step 1405 to determine whether the self-sense standard deviation is greater than a temperature threshold. The temperature threshold may include a low temperature threshold and a high temperature threshold. When the standard deviation exceeds this threshold, indicating a potential temperature-related raw data shift in step 1405, the process proceeds to step 1407 to determine if the Low & High Temp Flag is FALSE. If the Low & High Temp Flag is FALSE, the Low & High Temp Flag is set to TRUE in step 1409. Referring to flowchart 1300 of FIG. 13C, when the Low & High Temp Flag is TRUE and the lid is closing, the close coefficient is applied to the reference strength in step 1329 and subsequently added to the angle strength in step 1331 to compensate for the raw data shift. Likewise, when the Low & High Temp Flag is TRUE and the lid is opening, the open coefficient is applied to the reference strength in step 1335 and subsequently subtracted from the angle strength in step 1337 to compensate for the raw data shift.

When the standard deviation does not exceed the temperature threshold in step 1405, the flowchart 1400 proceeds to step 1411 to evaluate whether the standard deviation has been lowered below a hysteresis range. In various embodiments, the hysteresis range is a threshold range below the temperature threshold. If the standard deviation has been lowered below the hysteresis range, the Low & High Temp Flag is set to FALSE in step 1413. When the standard deviation is within the hysteresis range, the Low & High Temp Flag does not change as shown in step 1410. For example, if the Low & High Temp Flag is TRUE and the standard deviation is within the hysteresis range (1411=N), the Low & High Temp Flag remains TRUE. In step 1410, the Low & High Temp Flag can be TRUE or FALSE. If the Low & High Temp Flag is TRUE, the close or open coefficient can be applied as described in step 1409. If the Low & High Temp Flag is FALSE, the process flows to step 1415 as described below.

The flowchart 1400 continues on FIG. 14B to perform a temperature compensation by evaluating multiple conditions to determine when to adjust the angle strength value. In step 1415, the process determines whether the sum of a pure differential threshold (Pure Diff Threshold) and absolute value of the angle strength (ABS(Angle Strength)) is less than the absolute value of the pure strength (ABS(Pure Strength)). If ((Pure Diff Threshold)+ABS(Angle Strength)) <ABS (Pure Strength), this condition may indicate that the edge state has not changed to an edge detect state due to an error that occurs when the raw data changes slowly.

If ((Pure Diff Threshold)+ABS(Angle Strength)) is greater than ABS(Pure Strength), the process flows to step 1419 to determine whether the lid status is open and the lid open threshold exceeds the pure strength value. If the lid status is open and the lid open threshold exceeds the pure strength value, these simultaneous conditions may indicate that the lid status has not changed when the lid is opened more than the open threshold.

When the lid status is not open or the lid open threshold does not exceed the pure strength value, the process proceeds to step 1425 to determine whether the lid status is closed and the lid close threshold is less than the pure strength value. If the lid status is closed and the lid close threshold is less than the pure strength value, these simultaneous conditions may indicate that the lid status has not changed when the lid is closed more than the close threshold.

When ((Pure Diff Threshold)+ABS(Angle Strength)) is less than ABS (Pure Strength) in step 1415, the lid status is open and the lid open threshold exceeds the pure strength value in step 1419, or the lid status is closed and the lid close threshold is less than the pure strength value in step 1425, the process flows to step 1417 to increase a pure compensate debounce count and compares the pure compensate count with the compensate threshold in step 1421. When the pure compensate count is not greater than the compensate threshold in step 1421, the process flows to step 1429 to end the temperature compensation process. When the pure compensate count is greater than the compensate threshold in step 1421, the angle strength is set equal to the pure strength and the pure compensate count is set to zero in step 1423 and the process flows to step 1429 to end the temperature compensation process.

Figure 15:
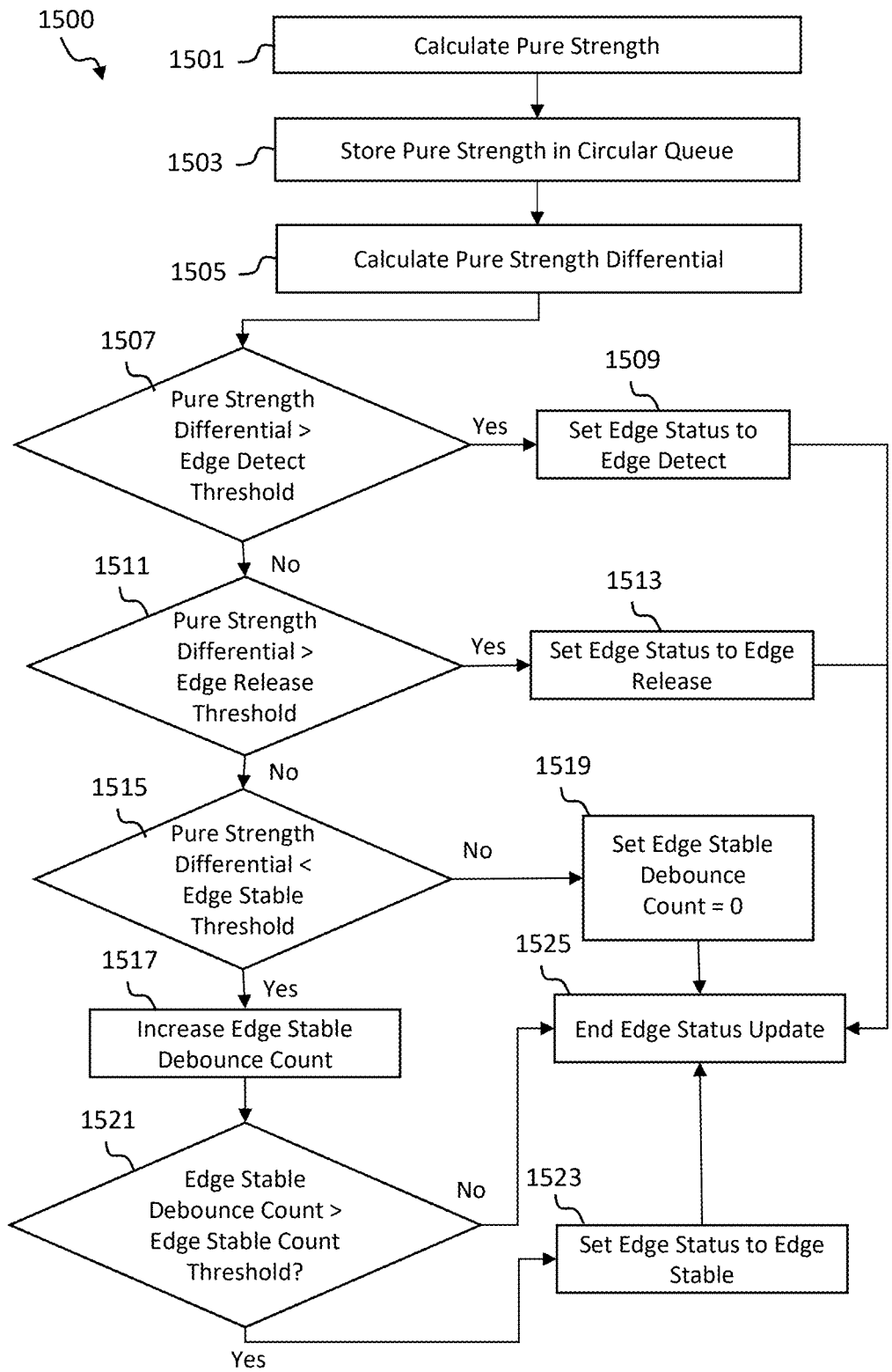
FIG. 15 illustrates a flowchart 1500 for determining an edge state in a foldable device according to an embodiment of the present application.

FIG. 15 illustrates a flowchart 1500 for determining an edge state in a foldable device according to an embodiment of the present application. FIG. 15 will be described in conjunction with FIG. 7A-7D. The flowchart 1500 demonstrates calculating, storing, and analyzing pure strength values to determine the current edge state of the device.

The process begins by calculating the pure strength in step 1501. In various embodiments, pure strength is equal to the sum of the absolute value of the pure differential for a first sense line in the folding area 108 and the absolute value of the pure differential for a second sense line in the folding area 108. For example, as described in FIG. 5B, Pure Strength=ABS(Rx20 Pure Differential)+ABS(Rx22 Pure Differential). The pure differential is a difference between the pure raw value and current raw value, e.g., Pure Differential=Pure Raw Current Raw.

When the pure strength value is calculated, the pure strength value is then stored in a circular queue in step 1503. The circular queue is a data structure that provides efficient storage and retrieval of historical values. The process proceeds to step 1505 to calculate a pure strength differential (Pure STR Diff). As described in FIG. 7A, the pure strength differential is an absolute value of the difference between a sum of a first stored set of pure strength values in the circular queue and a sum of a second stored set of pure strength values in the circular queue.

The flowchart 1500 proceeds to a series of evaluations to determine the edge state. In step 1507, the pure strength differential is compared to the edge detect threshold. When the pure strength differential is greater than the edge detect threshold, the process flows to step 1509 to set the edge state to edge detect and proceeds to end the edge status update in step 1525.

When the pure strength differential is not greater than the edge detect threshold in step 1507, the process flows to step 1511 where the pure strength differential is compared to the edge release threshold. When the pure strength differential is greater than the edge release threshold, the process flows to step 1513 to set the edge state to edge release and proceeds to end the edge status update in step 1525.

When the pure strength differential is not greater than the edge release threshold in step 1511, the process flows to step 1515 where the pure strength differential is compared to the edge stable threshold. When the pure strength differential is not less than the edge stable threshold, the process flows to step 1519 to set an edge stable debounce count to zero and proceeds to end the edge status update in step 1525. On the other hand, when the pure strength differential is less than the edge stable threshold, the process flows to step 1517 to increase the edge stable debounce count. The process proceeds to step 1521 where the edge stable debounce count is compared with the edge stable count threshold. When the edge stable debounce count is greater than the edge stable count threshold, the edge state is set to edge stable in step 1523 and proceeds to end the edge status update in step 1525. When the edge stable debounce count is not greater than the edge stable count threshold, the process flows to step 1525 to end the edge status update.

In various embodiments, this edge detection process allows the foldable device to track changes in its folding state. By using thresholds and a debounce mechanism, the system can distinguish between significant state changes.

Example embodiments of the present invention are summarized here. Other embodiments can also be understood from the entirety of the specification and the claims filed herein. It is understood that various embodiments described herein can be combined.

Example 1. A first example comprises a method of operating an electronic device. The method comprises detecting, by a touchscreen controller, self-capacitances sensed in a folding area of a touchscreen using a self-sensing scan, where the folding area includes a first portion and a second portion on the touchscreen, and the first portion and the second portion are separated by a folding axis. The method also comprises determining, in a partially folded position, a reference strength sensed by the touchscreen in the folding area based on the self-capacitances in the folding area, determining that the device is outside a half-folded position based on the reference strength, in response to determining that the device is outside the half-folded position, determining temperature information of the touchscreen, in response to determining that the temperature information of the touchscreen is outside a predetermined temperature window, determining a corrected reference strength from the reference strength based on the temperature information, determining an angle strength for the partially folded position based on the corrected reference strength, and determining whether the device is open or closed based on the angle strength.

Example 2. The method of example 1 can further comprise determining that the touchscreen is in a low power operating mode in the partially folded position, and in response to determining that the touchscreen is in the low power operating mode, determining the corrected reference strength further comprises adjusting the corrected reference strength to account for a lower operating voltage of the low power operating mode.

Example 3. The method of any of the above examples can further comprise determining that a folding angle of the device is more than a folded threshold, and determining the corrected reference strength further comprises adjusting the corrected reference strength to amplify the reference strength based on the folding angle of the device and the folded threshold.

Example 4. The method of any of the above examples can further comprise determining that the device is open when the angle strength reaches an open threshold.

Example 5. The method of any of the above examples can further comprise, in response to determining that the device is open, setting, by the touchscreen controller, a scan mode to normal power mode.

Example 6. The method of any of the above examples can further comprise, in response to determining that the device is open based on the angle strength, reporting to a host that the device is open, and in response to receiving the report that the device is open, turning on a display of the touchscreen by the host.

Example 7. The method of any of the above examples can further comprise determining the device is closed when the angle strength reaches a close threshold, and in response to determining that the device is closed, setting, by the touchscreen controller, a scan mode to ultra-low power mode.

Example 8. The method of any of the above examples can further comprise, in response to determining that the device is closed based on the angle strength, reporting to a host that the device is closed, and in response to receiving the report that the device is closed, turning off a display of the touchscreen by the host.

Example 9. In the above examples, determining the temperature information of the touchscreen in the partially folded position can comprise detecting, by the touchscreen controller, self-capacitances in a standard deviation area using the self-sensing scan, the standard deviation area including areas of the touchscreen outside of the folding area, an edge area, or any area of the touchscreen currently being touched, determining a self-sense standard deviation from the standard deviation area, and determining that the self-sense standard deviation is outside the predetermined temperature window.

Example 10. The method of any of the above examples can further comprise determining, by the touchscreen controller, a baseline strength of the touchscreen, determining, by the touchscreen controller, differences between the baseline strength and the self-capacitances sensed in the folding area, and determining, by the touchscreen controller, a pure strength of the touchscreen by adding an absolute value of two largest differences between the baseline strength and the self-capacitances in the folding area.

Example 11. In the above examples, determining the baseline strength of the touchscreen can further comprise performing, by the touchscreen controller, an auto tune of the touchscreen.

Example 12. The method of any of the above examples can further comprise storing the pure strength of the touchscreen in a circular queue, calculating a difference between a first set of pure strengths and a second set of pure strengths, the first set of pure strengths being a sum of pure strengths stored earlier in the circular queue and the second set of pure strengths being a sum of pure strengths stored later in the circular queue, and determining that an edge state is stable based on the difference between the first set of pure strengths and the second set of pure strengths, wherein determining that the edge state is stable indicates that the self-capacitances in the folding area is steady for a predetermined duration of time, in response to the difference being greater than a first edge threshold or a second edge threshold, determining that the edge state is unstable, and in response to the difference being less than a third edge threshold, determining that the edge state is stable.

Example 13. A second example comprises a method of operating an electronic device. The method comprises detecting, by a touchscreen controller, self-capacitances sensed in a folding area of a touchscreen using a self-sensing scan, where the folding area includes a first portion and a second portion on the touchscreen, and the first portion and the second portion are separated by a folding axis, in a partially folded position, determining a reference strength sensed by the touchscreen in the folding area based on the self-capacitances in the folding area, determining that the device is outside a half-folded position based on the reference strength, in response to determining that temperature information of the touchscreen is outside a predetermined temperature window, determining a first corrected reference strength from the reference strength based on the temperature information or in response to determining that the touchscreen is in a low power operating mode, determining a second corrected reference strength from the reference strength to account for a lower operating voltage of the low power operating mode, and determining an angle strength for the partially folded position based on the first or second corrected reference strength.

Example 14. The method of example 13 can further comprise, in response to determining that the temperature information of the touchscreen is within the predetermined temperature window and in response to determining that the device is not operating in low power mode, determining whether the folding angle is more than the folded threshold, in response to determining whether the folding angle of the touchscreen is more than a folded threshold, determining a third corrected reference strength to amplify the reference strength based on the folding angle of the device and the folded threshold, and determining the angle strength for the partially folded position based on the third corrected reference strength.

Example 15. The method of any of the above examples can further comprise determining that the angle strength reaches an open threshold, and in response to the angle strength reaching the open threshold, sending an open event to a host.

Example 16. The method of any of the above examples can further comprise, in response to the open event, setting, by the touchscreen controller, a scan mode to normal power mode, and in response to the open event, turning on, by the host, a display of the touchscreen.

Example 17. The method of any of the above examples can further comprise determining that the angle strength reaches a close threshold, and in response to the angle strength reaching the close threshold, sending a close event to a host.

Example 18. The method of any of the above examples can further comprise in response to the close event, setting, by the touchscreen controller, a scan mode to ultra-low power mode, and in response to the close event, turning off, by the host, a display of the touchscreen.

Example 19. In the above examples, determining the angle strength for the partially folded position based on the first or second corrected reference strength can comprise determining that the device is folding, and in response to determining that the device is folding, adding the first or second corrected reference strength to the angle strength.

Example 20. In the above examples, determining the angle strength for the folded position based on the first or second corrected reference strength can comprises determining that the device is unfolding, and in response to determining that the device is unfolding, subtracting the first or second corrected reference strength from the angle strength.

Example 21. In another example, a device comprises a touchscreen that includes a first portion and a second portion, the first portion configured to be rotated with respect to the second portion around a folding axis positioned within a folding area, a touchscreen controller, and a memory for storing a program to be executed in the touchscreen controller. The program includes instructions to detect self-capacitances sensed in a folding area of the touchscreen using a self-sensing scan, determine, in a partially folded position, a reference strength sensed by the touchscreen in the folding area based on the self-capacitances in the folding area, determine that the touchscreen is outside a half-folded position based on the reference strength, determine a first corrected reference strength from the reference strength based on the temperature information in response to temperature information of the touchscreen being outside a predetermined temperature window, determine a second corrected reference strength from the reference strength to account for a lower operating voltage of the low power mode in response to the touchscreen operating in low power mode, or determining a third corrected reference strength to amplify the reference strength based on the folding angle of the device and the folded threshold in response to a folding angle of the touchscreen being more than a folded threshold, and determine an angle strength for the folded position based on the first, second, or third corrected reference strength.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating an electronic device, the method comprising:
    detecting, by a touchscreen controller, self-capacitances sensed in a folding area of a touchscreen using a self-sensing scan, wherein the folding area comprises a first portion and a second portion on the touchscreen, and the first portion and the second portion being separated by a folding axis;
    in a partially folded position, determining a reference strength sensed by the touchscreen in the folding area based on the self-capacitances in the folding area;
    determining that the device is outside a half-folded position based on the reference strength;
    in response to determining that the device is outside the half-folded position, determining temperature information of the touchscreen;
    in response to determining that the temperature information of the touchscreen is outside a predetermined temperature window, determining a corrected reference strength from the reference strength based on the temperature information;
    determining an angle strength for the partially folded position based on the corrected reference strength; and
    determining whether the device is open or closed based on the angle strength.

2. The method of claim 1, further comprising:
    determining that the touchscreen is in a low power operating mode in the partially folded position, wherein, in response to determining that the touchscreen is in the low power operating mode, determining the corrected reference strength further comprises adjusting the corrected reference strength to account for a lower operating voltage of the low power operating mode.

3. The method of claim 1, further comprising:
    determining that a folding angle of the device is more than a folded threshold, wherein determining the corrected reference strength further comprises adjusting the corrected reference strength to amplify the reference strength based on the folding angle of the device and the folded threshold.

4. The method of claim 1, further comprising determining that the device is open when the angle strength reaches an open threshold.

5. The method of claim 4, further comprising:
    in response to determining that the device is open, setting, by the touchscreen controller, a scan mode to normal power mode.

6. The method of claim 1, further comprising:
    in response to determining that the device is open based on the angle strength, reporting to a host that the device is open; and
    in response to receiving the report that the device is open, turning on a display of the touchscreen by the host.

7. The method of claim 1, further comprising determining the device is closed when the angle strength reaches a close threshold; and
    in response to determining that the device is closed, setting, by the touchscreen controller, a scan mode to ultra-low power mode.

8. The method of claim 1, further comprising:
    in response to determining that the device is closed based on the angle strength, reporting to a host that the device is closed; and
    in response to receiving the report that the device is closed, turning off a display of the touchscreen by the host.

9. The method of claim 1, wherein determining the temperature information of the touchscreen in the partially folded position comprises:
    detecting, by the touchscreen controller, self-capacitances in a standard deviation area using the self-sensing scan, the standard deviation area including areas of the touchscreen outside of the folding area, an edge area, or any area of the touchscreen currently being touched;
    determining a self-sense standard deviation from the standard deviation area; and
    determining that the self-sense standard deviation is outside the predetermined temperature window.

10. The method of claim 1, further comprising:
    determining, by the touchscreen controller, a baseline strength of the touchscreen;
    determining, by the touchscreen controller, differences between the baseline strength and the self-capacitances sensed in the folding area; and
    determining, by the touchscreen controller, a pure strength of the touchscreen by adding an absolute value of two largest differences between the baseline strength and the self-capacitances in the folding area.

11. The method of claim 10, wherein determining the baseline strength of the touchscreen further comprises performing, by the touchscreen controller, an auto tune of the touchscreen.

12. The method of claim 10, further comprising:
    storing the pure strength of the touchscreen in a circular queue;
    calculating a difference between a first set of pure strengths and a second set of pure strengths, the first set of pure strengths being a sum of pure strengths stored earlier in the circular queue and the second set of pure strengths being a sum of pure strengths stored later in the circular queue; and
    determining that an edge state is stable based on the difference between the first set of pure strengths and the second set of pure strengths, wherein determining that the edge state is stable indicates that the self-capacitances in the folding area are steady for a predetermined duration of time;
    in response to the difference being greater than a first edge threshold or a second edge threshold, determining that the edge state is unstable; and
    in response to the difference being less than a third edge threshold, determining that the edge state is stable.

13. A method of operating an electronic device, the method comprising:
    detecting, by a touchscreen controller, self-capacitances sensed in a folding area of a touchscreen using a self-sensing scan, wherein the folding area comprises a first portion and a second portion on the touchscreen, and the first portion and the second portion being separated by a folding axis;

in a partially folded position, determining a reference strength sensed by the touchscreen in the folding area based on the self-capacitances in the folding area;

determining that the device is outside a half-folded position based on the reference strength;

in response to determining that temperature information of the touchscreen is outside a predetermined temperature window, determining a first corrected reference strength from the reference strength based on the temperature information or in response to determining that the touchscreen is in a low power operating mode, determining a second corrected reference strength from the reference strength to account for a lower operating voltage of the low power operating mode; and determining an angle strength for the partially folded position based on the first or second corrected reference strength.

14. The method of claim 13, further comprising:

in response to determining that the temperature information of the touchscreen is within the predetermined temperature window and in response to determining that the device is not operating in low power mode, determining whether a folding angle is more than a folded threshold;

in response to determining that the folding angle of the touchscreen is more than the folded threshold, determining a third corrected reference strength to amplify the reference strength based on the folding angle of the device and the folded threshold; and determining the angle strength for the partially folded position based on the third corrected reference strength.

15. The method of claim 13, further comprising:

determining that the angle strength reaches an open threshold; and in response to the angle strength reaching the open threshold, sending an open event to a host.

16. The method of claim 15, further comprising:

in response to the open event, setting, by the touchscreen controller, a scan mode to normal power mode; and in response to the open event, turning on, by the host, a display of the touchscreen.

17. The method of claim 13, further comprising:

determining that the angle strength reaches a close threshold; and in response to the angle strength reaching the close threshold, sending a close event to a host.

18. The method of claim 17, further comprising:

in response to the close event, setting, by the touchscreen controller, a scan mode to ultra-low power mode; and in response to the close event, turning off, by the host, a display of the touchscreen.

19. The method of claim 13, wherein determining the angle strength for the partially folded position based on the first or second corrected reference strength comprises:

determining that the device is folding; and in response to determining that the device is folding, adding the first or second corrected reference strength to the angle strength.

20. The method of claim 13, wherein determining the angle strength for the partially folded position based on the first or second corrected reference strength comprises:

determining that the device is unfolding; and in response to determining that the device is unfolding, subtracting the first or second corrected reference strength from the angle strength.

21. A device comprising:

a touchscreen comprising a first portion and a second portion, the first portion configured to be rotated with respect to the second portion around a folding axis positioned within a folding area;

a touchscreen controller; and a memory for storing a program to be executed in the touchscreen controller, the program comprising instructions to:

detect self-capacitances sensed in the folding area of the touchscreen using a self-sensing scan;

in a partially folded position, determine a reference strength sensed by the touchscreen in the folding area based on the self-capacitances in the folding area;

determine that the touchscreen is outside a half-folded position based on the reference strength;

in response to temperature information of the touchscreen being outside a predetermined temperature window, determine a first corrected reference strength from the reference strength based on the temperature information;

in response to the touchscreen operating in low power mode, determine a second corrected reference strength from the reference strength to account for a lower operating voltage of the low power mode; or in response to a folding angle of the touchscreen being more than a folded threshold, determinine a third corrected reference strength to amplify the reference strength based on the folding angle of the device and the folded threshold; and determine an angle strength for the partially folded position based on the first, second, or third corrected reference strength.

* * * * *